United States Patent
Friestad et al.

(10) Patent No.: US 9,433,141 B2
(45) Date of Patent: Sep. 6, 2016

(54) WEAR LINER FOR SEED DELIVERY SYSTEM

(71) Applicant: Deere & Company, Moline, IL (US)

(72) Inventors: Michael E. Friestad, Rock Island, IL (US); Robert W. Martin, Davenport, IA (US)

(73) Assignee: Deere & Company, Moline, IL (US)

( * ) Notice: Subject to any disclaimer, the term of this patent is extended or adjusted under 35 U.S.C. 154(b) by 209 days.

(21) Appl. No.: 14/170,282

(22) Filed: Jan. 31, 2014

(65) Prior Publication Data

US 2014/0182494 A1 Jul. 3, 2014

Related U.S. Application Data

(63) Continuation-in-part of application No. 13/072,051, filed on Mar. 25, 2011, now Pat. No. 8,850,998.

(60) Provisional application No. 61/885,529, filed on Oct. 2, 2013.

(51) Int. Cl.
*A01C 7/20* (2006.01)
*A01C 7/16* (2006.01)
*A01C 7/04* (2006.01)

(52) U.S. Cl.
CPC ................ *A01C 7/20* (2013.01); *A01C 7/046* (2013.01); *A01C 7/16* (2013.01)

(58) Field of Classification Search
USPC .......................... 111/177–185, 200; 221/211
See application file for complete search history.

(56) References Cited

U.S. PATENT DOCUMENTS

| | | | | |
|---|---|---|---|---|
| 1,376,933 A * | 5/1921 | Gould, Jr. | ............. | A01C 11/02 111/107 |
| 2,960,258 A | 10/1953 | Dodwell | | |
| 3,156,201 A * | 11/1964 | Tweedale | ............... | A01C 7/044 111/179 |
| 3,757,995 A * | 9/1973 | Armstrong | ............. | B23Q 7/106 221/211 |
| 3,903,815 A * | 9/1975 | Winkler | ................. | A01C 21/00 111/92 |
| 3,999,690 A * | 12/1976 | Deckler | ................. | A01C 7/046 111/63 |
| 4,023,509 A * | 5/1977 | Hanson | .................... | A01C 7/04 111/172 |
| 5,025,736 A * | 6/1991 | Anderson | ................ | A01C 7/06 111/124 |
| 5,170,909 A | 12/1992 | Lundie et al. | | |
| 5,855,303 A | 1/1999 | Gregor | | |

(Continued)

FOREIGN PATENT DOCUMENTS

WO 2013049198 4/2013

OTHER PUBLICATIONS

European Search Report for Related Application No. EP15152614, Dated Jun. 18, 2015.

*Primary Examiner* — Alicia Torres
(74) *Attorney, Agent, or Firm* — Lorenz & Kopf, LLC

(57) ABSTRACT

A seed delivery system housing contains a transport mechanism for moving seed along a seed path through the delivery system housing. A wear liner may include a wear liner insert extending along a portion of the seed path within the delivery, the wear liner insert including a wear surface interposed between the transport mechanism and the seed delivery system housing to protect at least one of the seed and the seed delivery system housing from wear. In certain embodiments, various features of the liner may extend outside the seed delivery system housing, to further protect the housing.

14 Claims, 31 Drawing Sheets

(56) References Cited

U.S. PATENT DOCUMENTS

| | | | |
|---|---|---|---|
| 6,651,570 B1* | 11/2003 | Thiemke | A01C 7/20 111/184 |
| 7,661,377 B2 | 2/2010 | Keaton et al. | |
| 2002/0043201 A1* | 4/2002 | Dunham | A01C 7/046 111/185 |
| 2002/0050238 A1* | 5/2002 | Crabb | A01C 7/042 111/185 |
| 2003/0159631 A1* | 8/2003 | Sauder | A01C 7/04 111/171 |
| 2003/0167986 A1* | 9/2003 | Sauder | A01C 7/04 111/170 |
| 2010/0192818 A1 | 8/2010 | Garner et al. | |
| 2010/0192819 A1 | 8/2010 | Garner et al. | |
| 2012/0067260 A1 | 3/2012 | Garner et al. | |

* cited by examiner

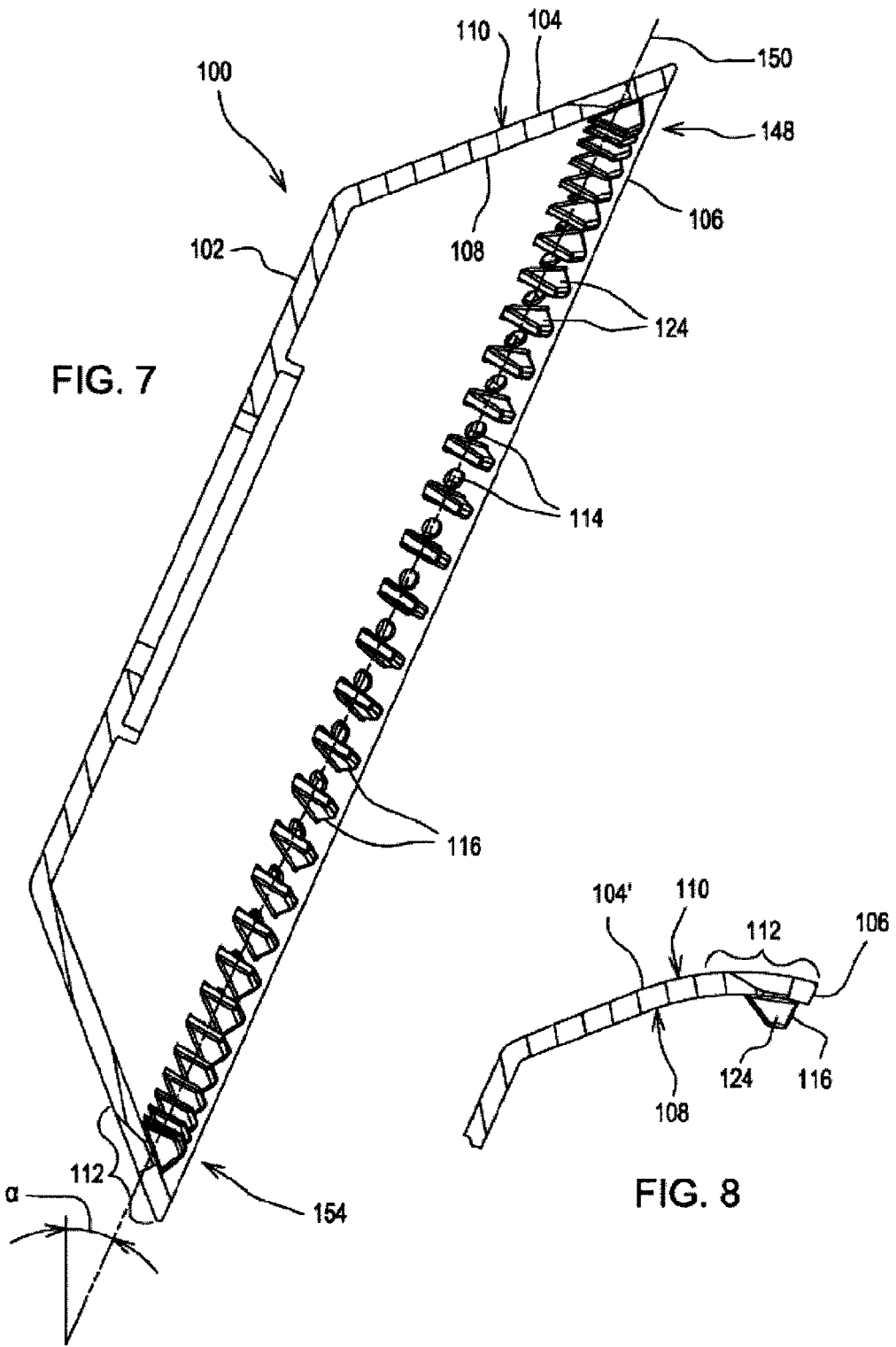

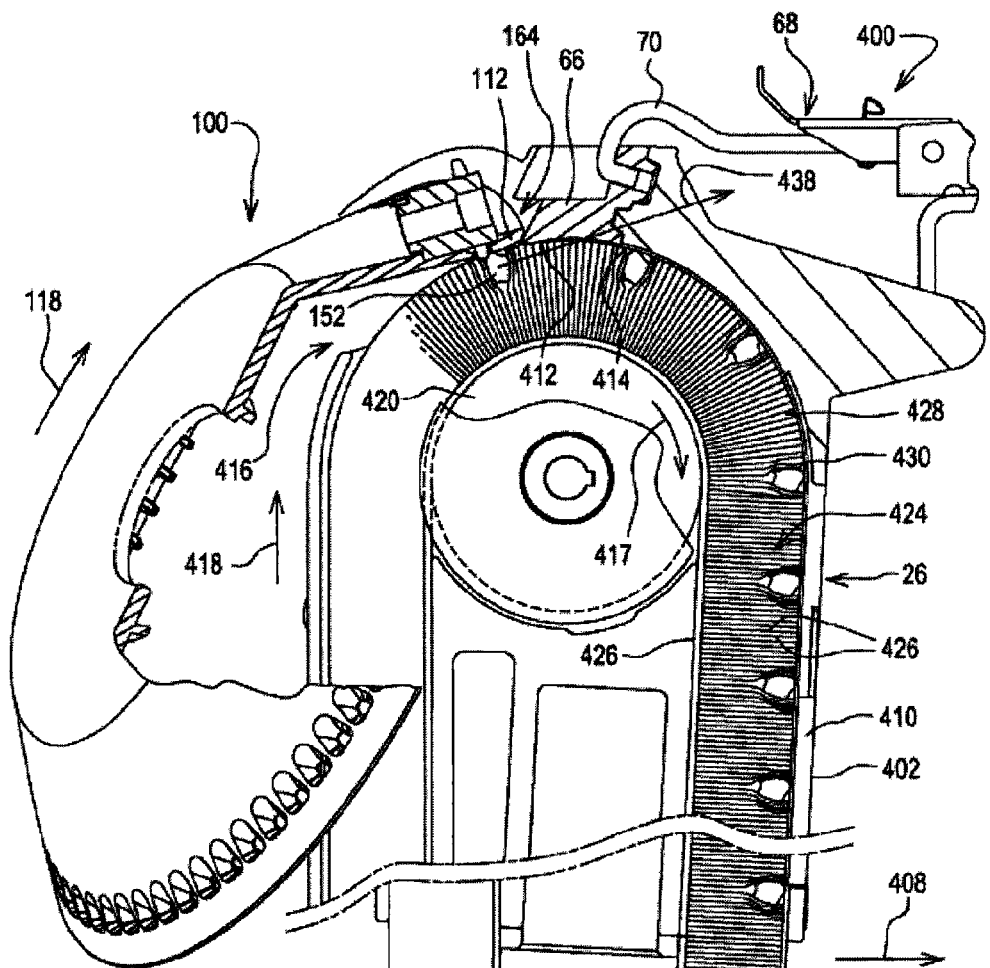
FIG. 10
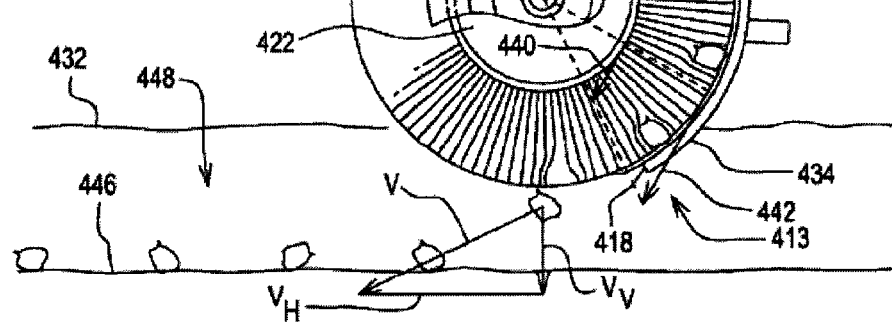

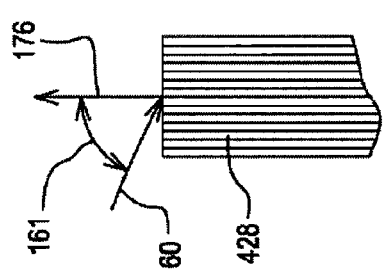
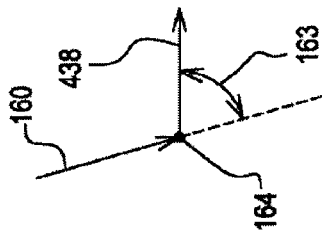
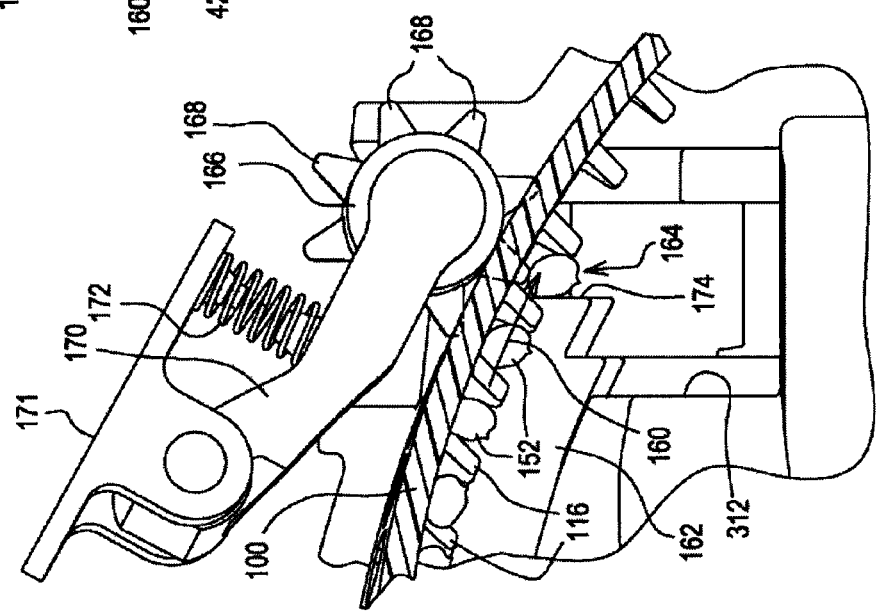
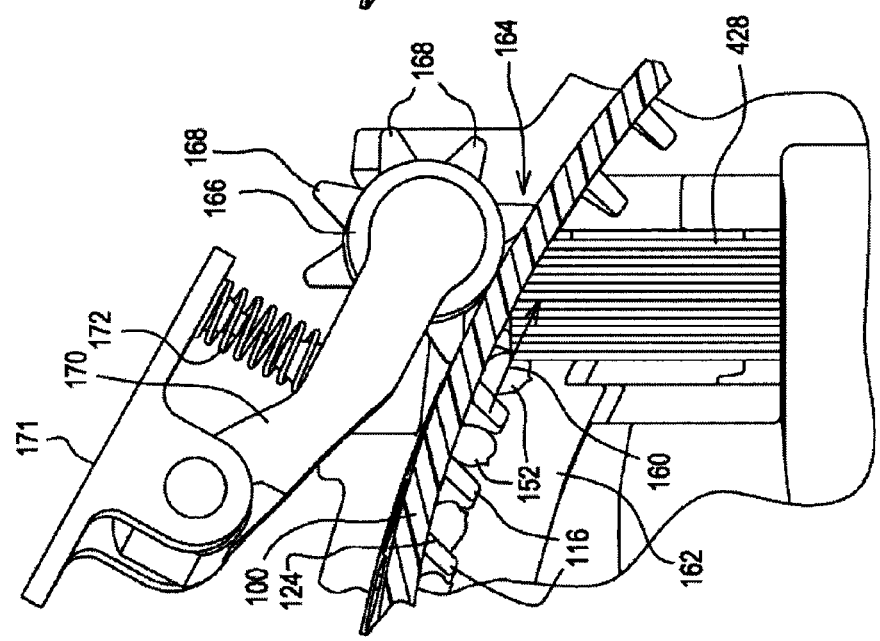

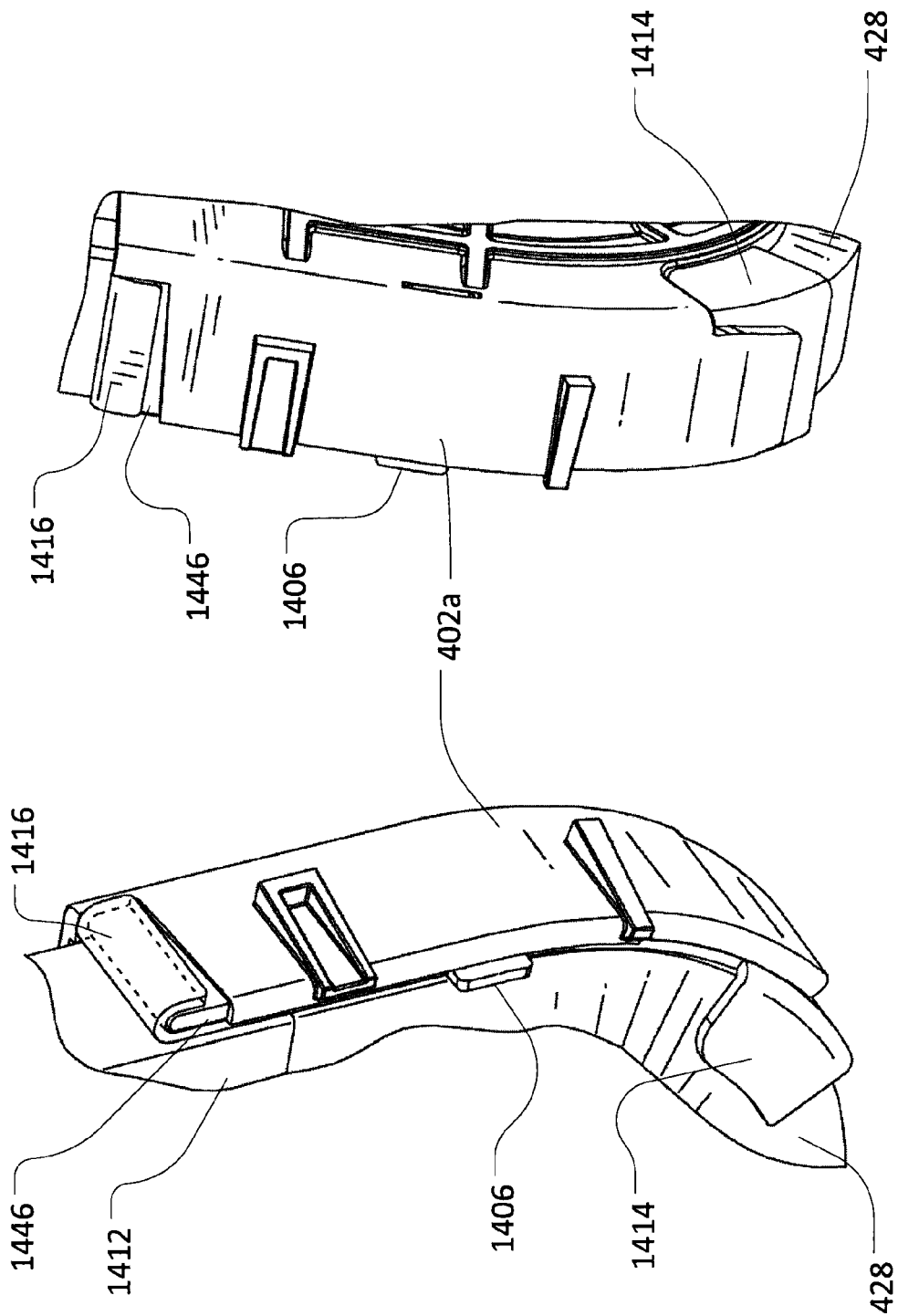

WEAR LINER FOR SEED DELIVERY SYSTEM

CROSS-REFERENCE TO RELATED APPLICATION(S)

This application is a Continuation-in-part of U.S. patent application Ser. No. 13/072,051, filed Mar. 25, 2011. This application also claims priority to U.S. provisional patent application No. 61/885,529, filed Oct. 2, 2013.

STATEMENT OF FEDERALLY SPONSORED RESEARCH OR DEVELOPMENT

Not applicable.

FIELD OF THE DISCLOSURE

The following relates to a planting unit for a seeding machine or planter, and more particularly to a planting unit having a seed delivery system with a seed-transport mechanism.

BACKGROUND OF THE DISCLOSURE

Various types of seed meters have been developed that use an air pressure differential, either vacuum or positive pressure, to adhere seed to a metering member. The metering member takes seed from a seed pool and sequentially discharges single seeds. (In some cases, multiple seeds may be discharged at a time.) One common type of seed meter is shown in U.S. Pat. No. 5,170,909. There, a seed disk 48 (as numbered in U.S. Pat. No. 5,170,909) contained in a housing is used to meter the seed. The seed pool is positioned on one side of the disk at a lower portion thereof while vacuum is applied to the opposite side of the disk. As the disk is rotated, individual seeds from the seed pool are adhered by the vacuum to apertures that extend though the disk. When the seed reaches a desired release position, the vacuum is terminated, allowing the seed to drop from the disk, through a seed tube to a furrow formed in the soil below.

Flexible belts have also been used in an air pressure differential seed meter. One example is shown in US patent application 2010/0192818 A1. There, a flexible belt having an array of apertures therein is movable along a path in a housing. A seed pool is formed on one side of the belt. Vacuum applied on the opposite side of the belt along a portion of the belt path adheres seed to the apertures, allowing the belt to move the seed to a release position where the vacuum is cut-off. The seed then falls or is removed from the belt.

When seed falls by gravity from the meter through the seed tube, it can be difficult to maintain accurate and consistent seed spacing at planting speeds greater than about 8 kph (5 mph). To maintain spacing accuracy, a seed delivery system that controls the seed as the seed moves from the seed meter to the soil is desirable. One such delivery system is shown in US patent application 2010/0192819-A1. With such a delivery system, seed may be carried by a transport mechanism through the delivery system for planting. During this (and other) transport, impact of the seed or the transport mechanism (and other moving parts) on components of the delivery system may result in undesirable wear on both the seed and the delivery system. As such, it may be useful to protect the seed and the delivery system during seed transport.

SUMMARY OF THE DISCLOSURE

An wear liner for the interior of a seed delivery system housing is disclosed for protecting the housing and seed being transported within the housing from wear.

According to one aspect of the disclosure, a seed delivery system with a housing is provided, the delivery system including a transport mechanism for moving seed along a seed path through the delivery system. A wear liner may include a wear insert extending along a portion of the seed path within the seed delivery system housing. The wear insert may include a wear surface interposed between the transport mechanism and the seed delivery system housing to protect at least one of the seed and the seed delivery system housing from wear. Various materials and coatings may be utilized, including, in certain embodiments, chrome plating along a portion of the wear surface.

In certain embodiments, the wear insert may include a plurality of distinct insert sections. Two insert sections may be disposed, respectively, on opposite sides of a sensing unit of a seed sensor for seed traveling within the housing. At a transition point between two insert sections, a first of the insert sections may provide a first clearance with respect to the transport mechanism and a second of the insert sections may provide a second, larger clearance with respect to the transport mechanism.

In certain embodiments, the wear insert may include various alignment tabs or retention tabs. The alignment tabs may extend into complimentary alignment openings in the seed delivery system housing. The retention tabs may extend into complimentary retention openings in the seed delivery system housing, and may be deformable to secure the wear insert to the housing.

In certain embodiments, the wear insert may include flanges extending away from the wear surface and outside the seed delivery system housing, to protect the housing from various furrow opening disks.

Various other embodiments are contemplated within the scope of the discussion herein.

BRIEF DESCRIPTION OF THE DRAWINGS

FIG. 7 is side cross-section of the metering member of FIG. 6 illustrating the orientation of the metering member installed in a seed meter mounted to a planting unit;

FIG. 8 is a fragmentary cross-section of an alternative metering member;

FIG. 10 is a side sectional view of one embodiment of the metering member and seed delivery system;

FIG. 11 is a sectional view of the hand-off of seed from the metering member to the delivery system including the delivery system brush belt;

FIG. 12 is a sectional view like FIG. 11 without the delivery system brush belt;

FIG. 13 is a schematic illustration the direction of entry of seed into the brush belt;

FIG. 14 is a schematic illustration of the direction of travel of the seed on the metering member and in the delivery system at the release position of seed from the metering member;

FIG. 38 is an enlarged perspective view of a lower portion of the wear liner and seed delivery system of FIG. 32;

FIG. 39 is another enlarged perspective view of a lower portion of the wear liner and seed delivery system of FIG. 32;

Like reference symbols in the various drawings indicate like elements.

DETAILED DESCRIPTION

Figure 1:
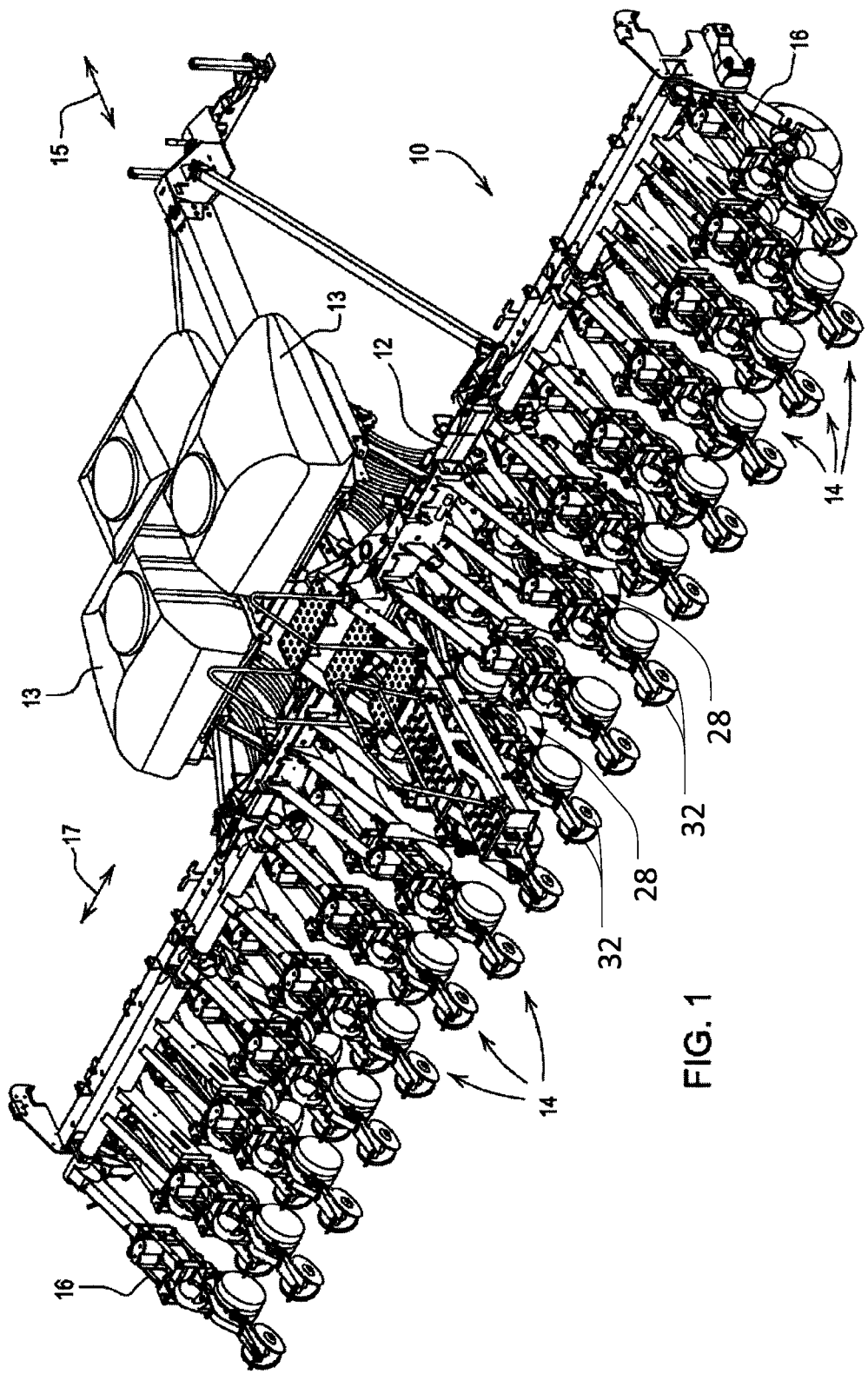
FIG. 1 is a perspective view of a common agricultural planter.
Figure 2:
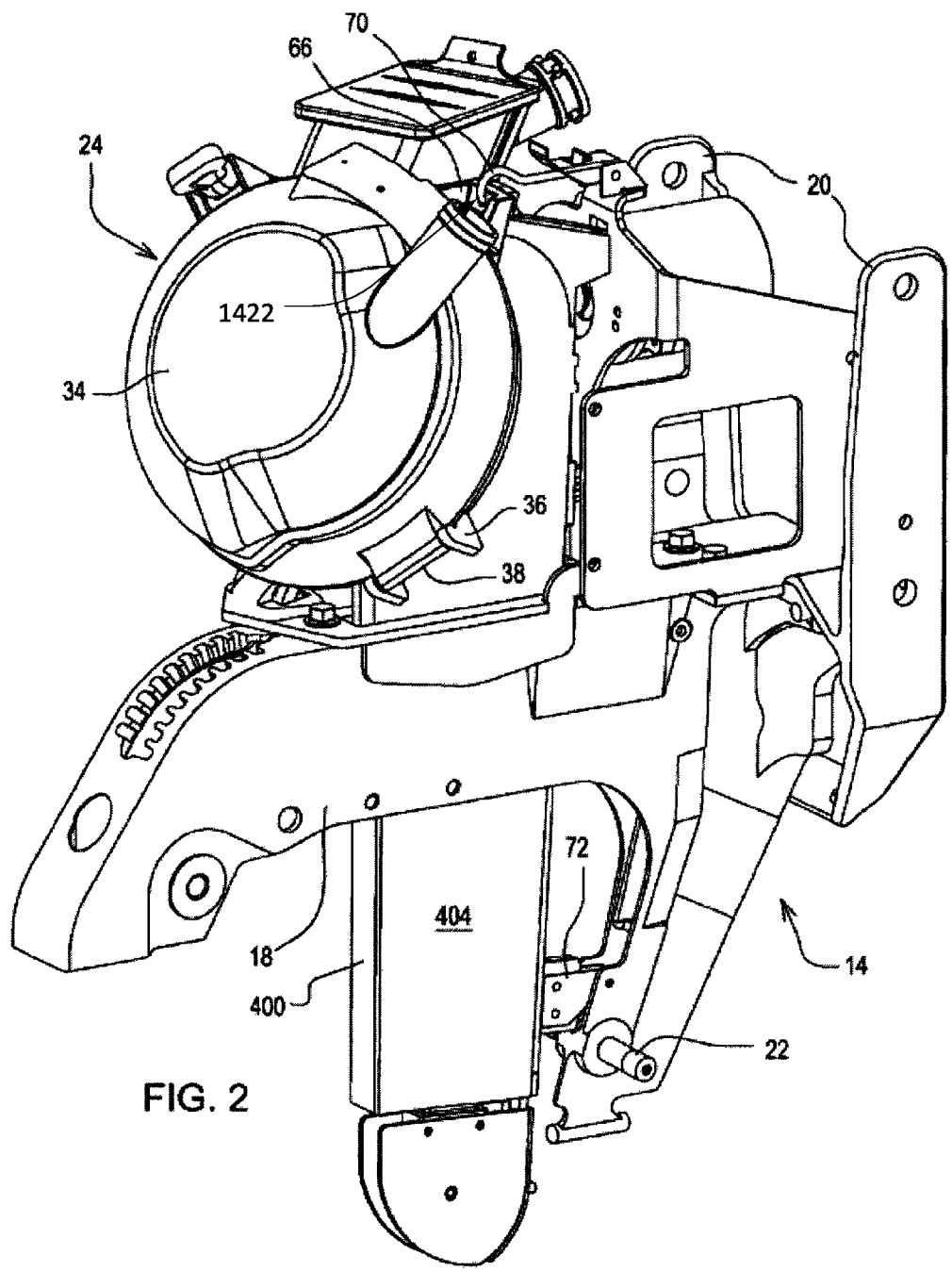
FIG. 2 is a side perspective view of a planting unit frame, seed meter and seed delivery system.

An agricultural seeding machine 10 is shown in FIG. 1 as a row crop planter. Seeding machine 10 has a central frame 12 on which are mounted a plurality of individual planting units 14. The seeding machine 10 has a fore-aft direction shown by the arrow 15 and a transverse direction shown by the arrow 17. Each planting unit 14 is coupled to the central frame 12 by a parallel linkage 16 so that the individual planting units 14 may move up and down to a limited degree relative to the frame 12. Large storage tanks 13 hold seed that is delivered pneumatically to a mini-hopper on each planting unit. Each planting unit 14 has a frame member 18 (FIG. 2) to which the components of the planting unit are mounted. The frame member 18 includes a pair of upstanding arms 20 at the forward end of thereof. The arms 20 are coupled to the rearward ends of the parallel linkage 16. Furrow opening disks 28 (not shown in FIG. 2) are attached to shaft 22 in a known manner to form an open furrow in the soil beneath the seeding machine into which seed is deposited. Closing and packing wheels 32 are also mounted to the frame member 18 in a known manner to close the furrow over the deposited seed and to firm the soil in the closed furrow. A seed meter 24 and a seed delivery system 400 are also attached to the frame member 18 of the planting unit.

The meter 24 includes a housing 30 (FIG. 3) and a cover 34. The housing 30 and the cover 34 are coupled to one another by complementary hinge features 36 and 38 (see FIG. 5) on the housing and cover respectively. Hinge feature 36 includes a pivot pin 37 coupled to the housing while the feature 38 is an integrally formed hook that wraps around the pivot pin allowing the cover 34 to pivot about the axis of the pin 37. An elastomeric latch member 40 is coupled to the housing 30 and has an enlarged portion 42 that is seated into a socket 44 formed in the cover to hold the cover in a closed position on the housing 30.

Figure 3:
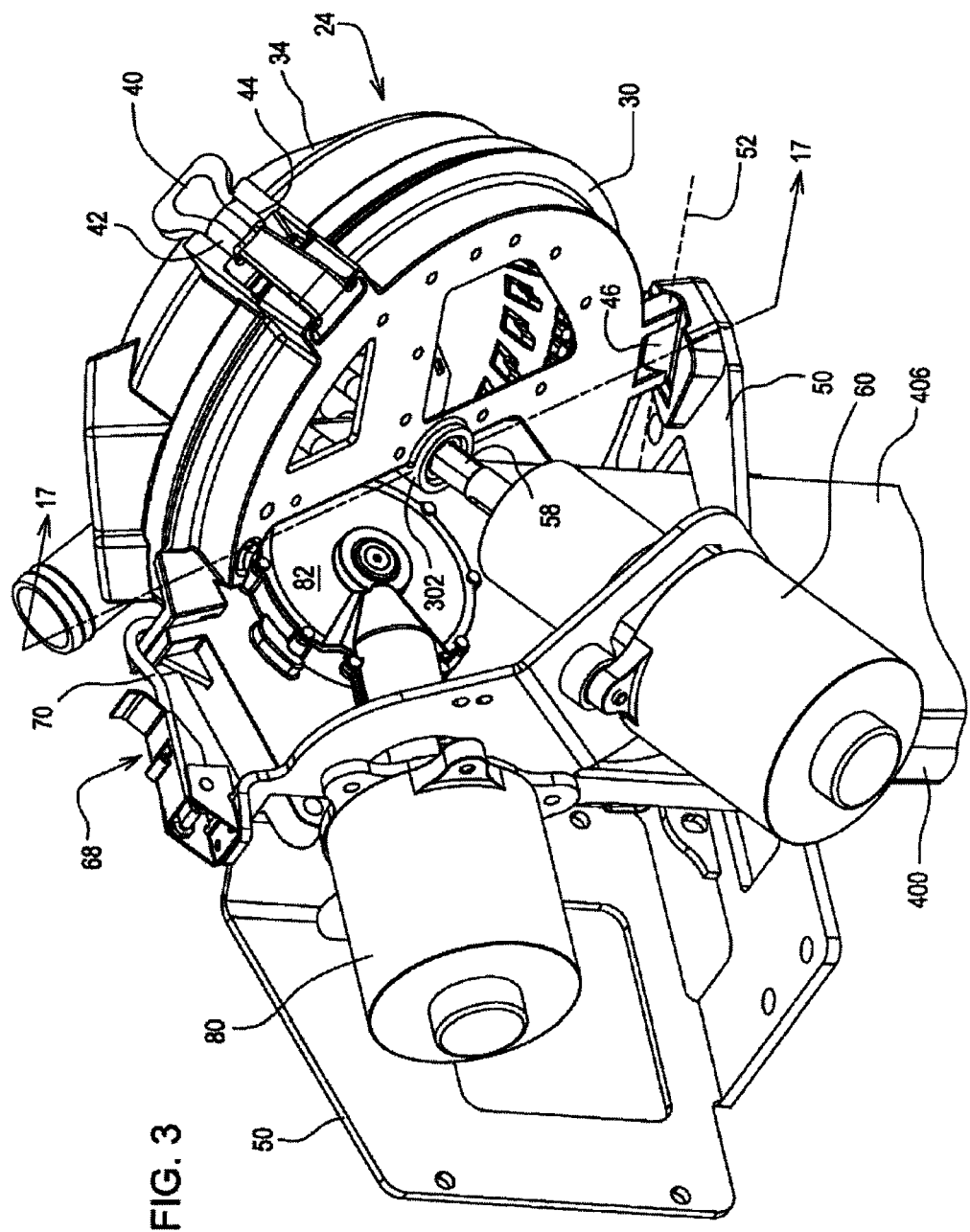
FIG. 3 is an enlarged perspective view of the seed meter and delivery system drives.
Figure 4:
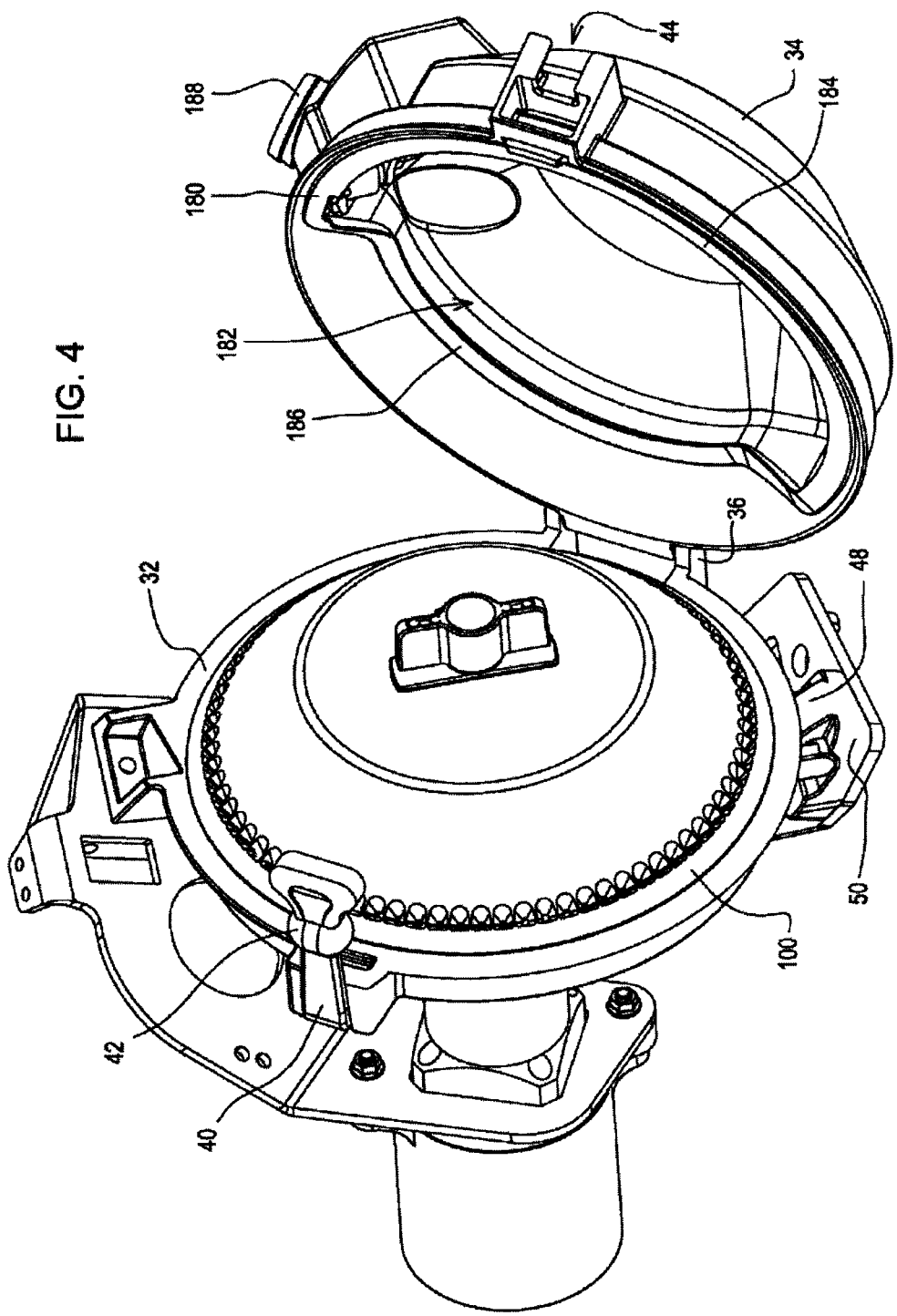
FIG. 4 is a perspective view of the seed meter with the cover open illustrating the metering member.

The housing 30 is formed with a second hinge element in the form of a pivot pin 46 (FIG. 3). Pivot pin 46 is seated into a hook member 48 (FIG. 4) of the mounting frame 50 attached to the frame member 18. This allows the seed meter 24 to pivot relative to the planting unit frame member 18 about an axis 52. A drive spindle 54 is carried by the housing 30 and has a drive hub 56 (FIG. 5) on the end thereof. The spindle 54 couples to the output shaft 58 of electric motor 60 to drive the seed meter when in the assembled position shown in FIG. 3. The seed meter 24 is coupled to the delivery system by a latch mechanism 68 including a metal rod 70 having a hook at one end seated into an aperture in the meter housing 30 when latched. The delivery system further has a mounting hook 72, partially shown in FIG. 2, which attaches to the planting unit frame member 18 to support the delivery system.

The delivery system 400 is driven by an electric motor 80, also carried by the mounting frame 50. The output shaft of motor 80 is connected to the delivery system through a right-angle drive 82. While electric motors have been shown to drive both the seed meter and the seed delivery system, it will be appreciated by those skilled in the art that other types of motors, such as hydraulic, pneumatic, etc. can be used as well as various types of mechanical drive systems.

Figure 6:
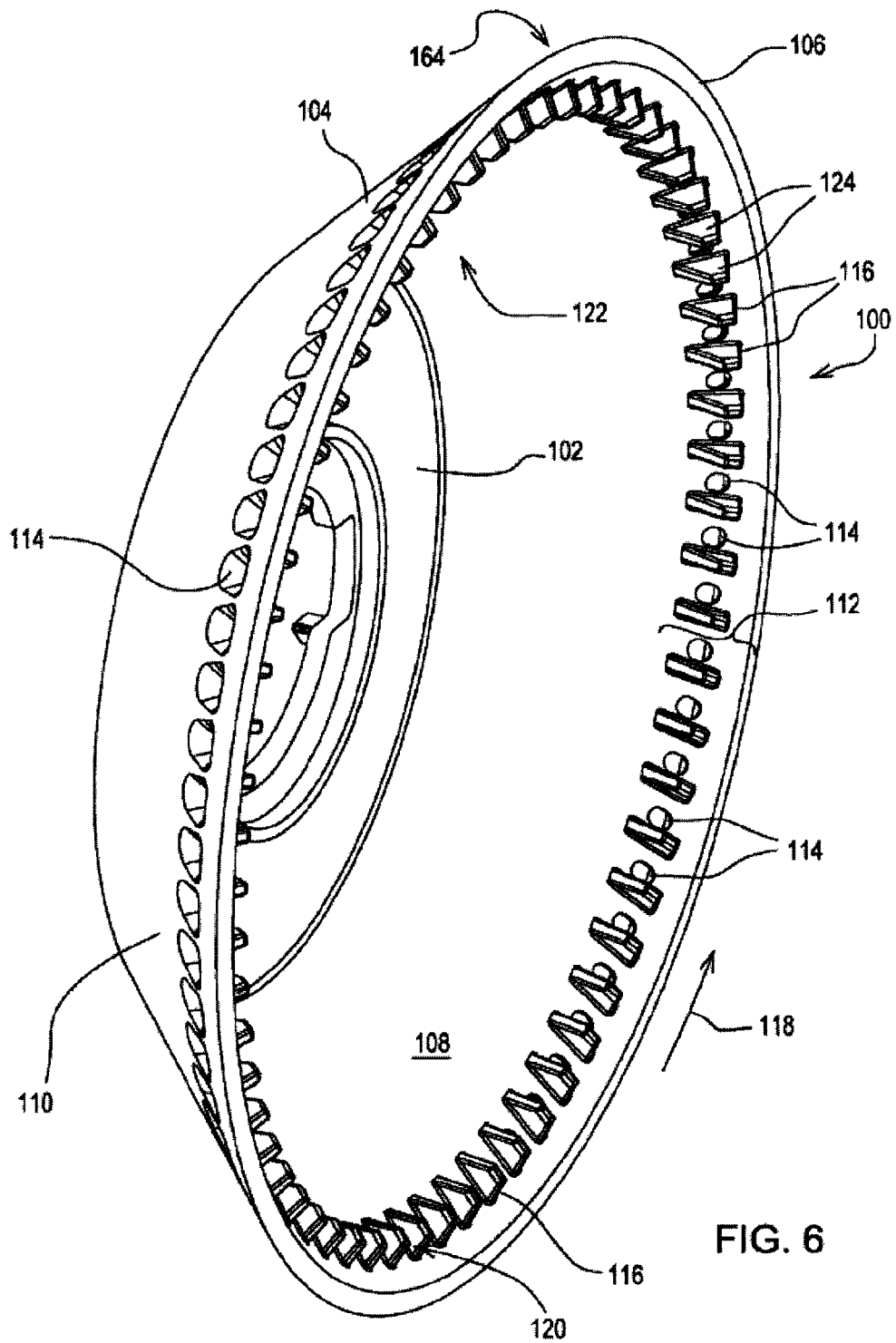
FIG. 6 is a perspective view of the metering member of FIG. 4.

With reference to FIG. 6, a metering member 100 of the seed meter is shown in greater detail. Metering member 100 is shown as a single piece, concave bowl shaped body. The bowl shaped body has a base portion 102 from which extends a sidewall 104. Sidewall 104 terminates in an outer edge 106. The sidewall has a radially inner surface 108 and a radially outer surface 110. Adjacent the outer edge 106, the sidewall has a rim portion 112 shown by the bracket in FIG. 6. The rim portion 112 extends radially outwardly and axially toward the outer edge 106. In the rim portion 112, there is an annular array of apertures 114 that extend through the sidewall between the inner and outer surfaces 108 and 110. The metering member 100 is mounted in the meter housing for rotation in the direction of the arrow 118 in FIG. 6. In operation, as the metering member rotates, individual seeds from a seed pool 120 located at a bottom portion of the metering member are adhered to the apertures 114 on the inner surface 108 of the sidewall and sequentially carried upward to a release position 164 at an upper portion of the metering member. Thus, the inner surface is also known as the seed side of the metering member. A series of raised features or projections, such as paddles 116, extend from the inner surface 108 of the sidewall 104 typically with one paddle located behind each aperture 114 in the direction of rotation. Each paddle forms a confronting surface 124 behind the associated aperture in the direction of rotation to push the seed adhered to the aperture into the delivery system as described below. As explained above, it is the rim portion 112 of the metering member that performs the function of drawing individual seeds from the seed pool and sequentially moving seed to the release position to supply seed individually to the seed delivery system 400.

The base portion 102 of the metering member contains a central drive aperture 130 (FIG. 5) used to mount the metering member on a rotational drive hub 56 for rotation about the axis 132 in a manner similar to mounting a flat seed disk in a seed meter as is well known. When mounted to the housing 30, the metering member 100 cooperates with the housing to form a trough to hold the seed pool 120 as described more fully below. The axis 132 is inclined to both a horizontal plane as well as to a vertical plane extending fore and aft of the seeding machine and a vertically plane extending transversely to the seeding machine.

With reference to FIG. 7, the metering member 100 is shown in a sectional view. The base portion 102 is a generally planar while the rim portion 112 of the inner surface of the sidewall 104 is outwardly flared, that is, extending both radially outward and axially. As shown in FIG. 7, the rim portion is frusto-conical. Alternatively, as shown in FIG. 8 in connection with a metering member sidewall 104', the inner surface of the sidewall rim portion 112 may be frusto-spherical in shape. Furthermore, while the rim portion 112 has been shown as being outwardly flared, the rim portion could be generally cylindrical without any outward flair, that is, extending only axially.

The metering member 100 can be formed as one piece or constructed of multiple pieces. The metering member can be most easily molded of plastic such as polycarbonate, nylon, polypropylene or urethane. However, other plastics can be used as well as other materials such as metal, etc. The metering member 100 is sufficiently rigid to be self-sustaining in shape without additional supporting structure. This is in contrast to the flexible belt metering member shown in U.S. Pat. No. 2,960,258 where it be belt member is preferably of a flexible elastomeric material and is supported within a support ring. Being self-sustaining in shape, the metering member does not need any supporting structure to hold a shape. As a self-sustaining, the metering member may be rigid or the metering member may be flexible to change shape when acted upon in a manner similar to the flexible seed disk of U.S. Pat. No. 7,661,377.

As previously mentioned, the metering member 100 can be mounted to a drive hub through the central drive aperture 130 in the base portion 102. Mounting through the central drive aperture 130 provides both mounting support of the metering member as well as the rotational drive of the metering member. Alternatively, support for the metering member can be provided on the outer surface of the sidewall. A groove may be formed in the outer surface of the sidewall to receive rollers that support the metering member. If the groove is also formed with drive teeth, one of the rollers could be driven by a motor to rotate the metering member. With such alternative arrangements possible, it is not necessary that the metering member have a base portion. The function of metering seed is performed by the sidewall and thus, the sidewall is the only required portion of the metering member.

As shown in FIG. 7, the metering member 100, when mounted in the meter housing, is oriented at an incline to the vertical as shown. In this orientation, the apertures 114 lie in a plane 150 inclined at an angle $\alpha$ relative to vertical. In this orientation, an upper portion 148 of the metering member overhangs or extends beyond a lower portion 154. As described below, this allows access to the upper portion 148 of the metering member for the mechanical seed delivery system 400. As shown, the angle $\alpha$ is approximately 24°. However, any angle will suffice as long as the upper portion 148 extends beyond the lower portion sufficiently for access for the seed delivery system from below the metering member at the seed release position.

Figure 9:
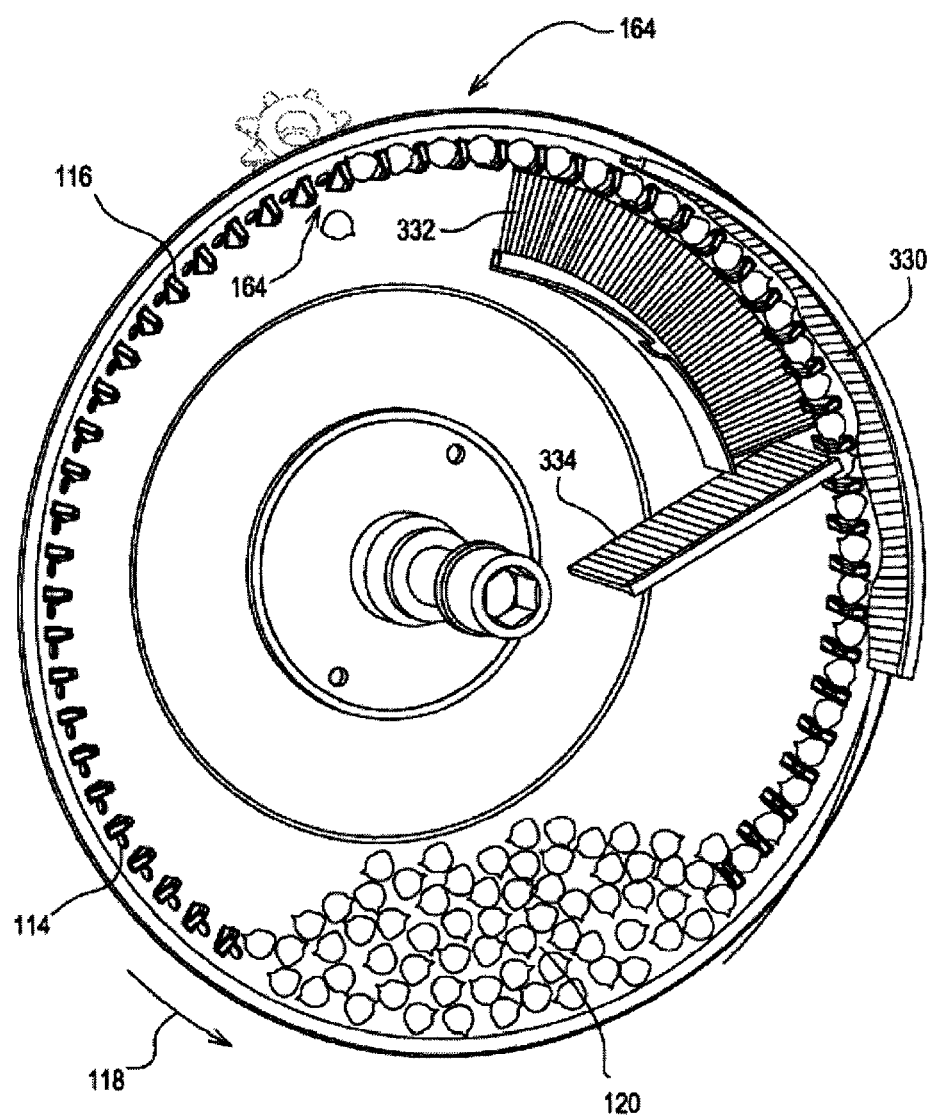
FIG. 9 is an elevational view of one embodiment of the inside of the metering member of FIG. 6.

The seed pool 120 is formed at the bottom of the metering member 100 as shown in FIG. 9. Vacuum is applied to the outer surface 110, causing individual seeds to be adhered to the apertures 114 as the apertures travel through the seed pool. As the metering member rotates as shown by the arrow 118, seed is moved upward to a release position 164 at the upper portion 148 of the metering member. The release position is slightly past the top or 12 O'clock position on the circular path of travel of the seed such that the seed is moving somewhat downward at the release position. This facilitates the seed's entry into the delivery system as more fully described below. Also, by being past the top point of the path, the delivery system is off center relative to the metering member providing clearance between the delivery system and the seed meter drive. At the release position 164, the inner surface of the rim portion of the metering member is facing downward such that seed is adhered beneath the metering member or is hanging from the metering member. See FIG. 10. The seed delivery system 400 is also positioned beneath the upper portion of the metering member at the release position 164 to take the seed from the metering member as shown in FIG. 10.

Delivery system 400 includes a housing 402 having a left sidewall 404 (see FIG. 19) and a right sidewall 406 (see FIG. 3). The terms left and right are used in relationship to the direction of travel of the seeding machine shown by the arrow 408. Connecting the left and right sidewalls to one another is an edge wall 410. An upper opening 416 is formed in the edge wall and sidewalls to allow seed to enter into the housing 402. A lower opening 418 is provided at the lower end forming a discharge location 413 for the seed. A pair of pulleys 420 and 422 are mounted inside the housing 402. The pulleys a support a belt 424 for rotation within the housing. One of the two pulleys is a drive pulley while the other pulley is an idler pulley. The belt has a flexible base member 426 to engage the pulleys. Elongated bristles 428 extend from the base member 426. The bristles are joined to the base member at proximal, or radially inner, ends of the bristles. Distal, or radially outer, ends 430 of the bristles touch or are close to touching the inner surface of the housing edge wall 410.

As shown at the top of FIG. 10, a seed 152 is at the release position on the metering member 100 and has just been inserted into the bristles 428 of the delivery system. At the release position, the rim portion 112 of the metering member sidewall 104 is generally tangent to the stationary inner surface 412 across which the brush bristles 428 sweep. The surface 412 is on a latch portion 66 of the housing 30. The surface 412 is a continuation of the inner surface 414 of the seed delivery system housing 402. Once the seed is captured in the delivery system, the seed moves in the direction of the belt, shown by the arrow 417. The direction of travel of the seed immediately upon capture by the delivery system 400 is shown by the vector 438.

Prior to release of the seed from the metering member, the seed is moving in the direction of vector 160 which is slightly downward into the bristles 428. With reference to FIG. 13, the vector 160 of the seed direction is at an angle 161 of about 60° to the length of the bristles 428 shown by the arrow 176. As shown in FIG. 11, the brush belt is positioned so that seed enters the bristles at the corner of the brush belt. The brush can be positioned so that the seed enters the brush through the distal ends of the bristles or through the side of the bristles.

The relationship between the seed direction vector 160 on the metering member and the seed direction vector 438 when the seed is first in the brush belt is shown in FIG. 14 illustrating the two vectors in the plane containing both vectors at the release position 164. The angle 163 between the vectors is at least 35° and preferably between 50° and 80°. This shows the cross-feed of the seed into the bristles, meaning that the seed, prior to the release position is moving substantially in a different direction than the brush bristles are moving. This is in contrast to the arrangement shown in FIG. 3 of the previously mentioned US patent application 2010/0192819-A1 where the seed on the metering disk at the release is moving in substantially the same direction as the brush bristles. This is also the relationship by which the bristles sweep over the inner surface of the sidewall relative to the travel direction of seed.

Figure 15:
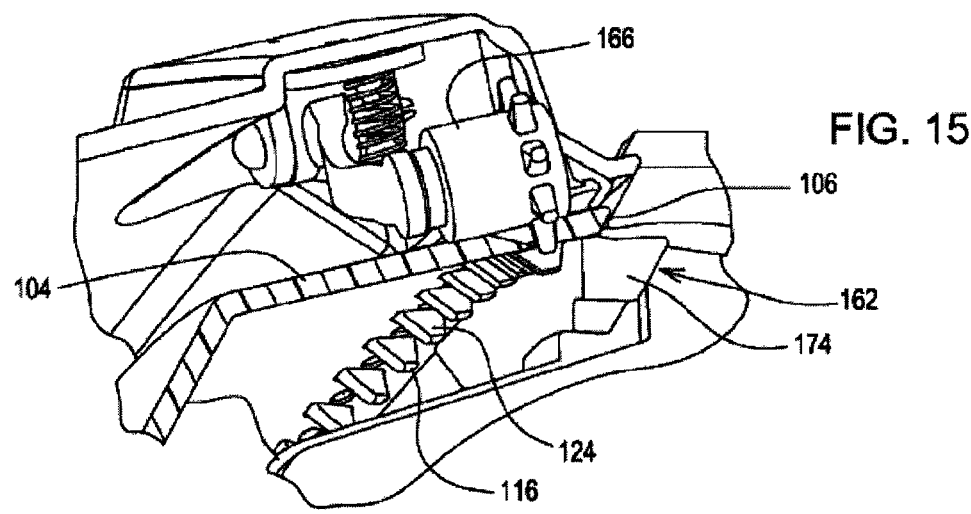
FIG. 15 is side sectional view of the metering member and delivery system at the hand-off without the brush belt.

FIGS. 11 and 12 show a blocking member 162 carried by the meter housing 30. Blocking member 162 is positioned adjacent a path of travel of seed 152 leading to the release position 164 and prevents movement of seed from the metering member prior to reaching the release position. Once the seed has passed the end 174 of the blocking member 162, the seed is free to move with the brush bristles in the direction of the vector 438 in FIG. 10. The blocking member ensures that the seed is consistently feed into the brush belt in the center of the belt, widthwise, rather than allowing the seed to enter the belt at random positions across the belt width. As shown in FIG. 15, the blocking member is located beneath the sidewall 104 of the metering member 100 between the paddles 116 and the outer edge 106 of the metering member. The confronting surfaces 124 of the paddles 116 push seed into the brush bristles. The paddles or projections 116 travel further into the brush bristles, that is deeper into the bristles from their distal ends, as the projections cross the width of the brush as seen in FIG. 11. Once seed is in the brush bristles, the seed is swept over the inner surface of the metering member, from the apertures 114 to the outer edge 106 of the metering member in the direction of the vector 438. The delivery system could be arranged to sweep seed in the opposite direction, that is, away from the outer edge 106 of the metering member.

To further ensure consistent release of seed from the metering member and hand-off to the delivery system, an ejector 166, carried by the cover 34 rides on the outer surface of the metering member rim portion. See FIGS. 11, 12 and 15. The ejector 166 is in the form of a star wheel having a number of projections 168. The projections 168 extend into the apertures 114 from the outer surface 110 of the sidewall 104 and force seed out of the apertures 114. The ejector is caused to rotate by rotation of the metering member 100 due to the projections 168 engaging in the apertures 114. The ejector is mounted to the cover 34 via a pivot arm 170 and bracket 171. The ejector 166 is biased against the metering member by a spring 172.

Turning attention once again to FIG. 4, a flexible seal 180 is shown on the inner side of the cover 34. This seal bears against the outer surface 110 of the metering member 100 forming a vacuum chamber within the interior 182 of the seal. A first portion 184 of the seal is spaced radially further out on the metering member than is the second portion 186 of the seal. In the area of the seal first portion 184, vacuum is applied to the apertures 114, causing seed to adhered thereto. There is no vacuum applied to the apertures adjacent and outside of the seal second portion 186. A port 188 in the cover 34 is adapted to connect the interior of the cover to a vacuum source in a known manner for a vacuum seed meter. The seed release position 164 is within the vacuum chamber. Thus, the brush belt and the ejector are working in opposition to the vacuum applied to the apertures 114 to release the seed from the metering member.

Figure 16:
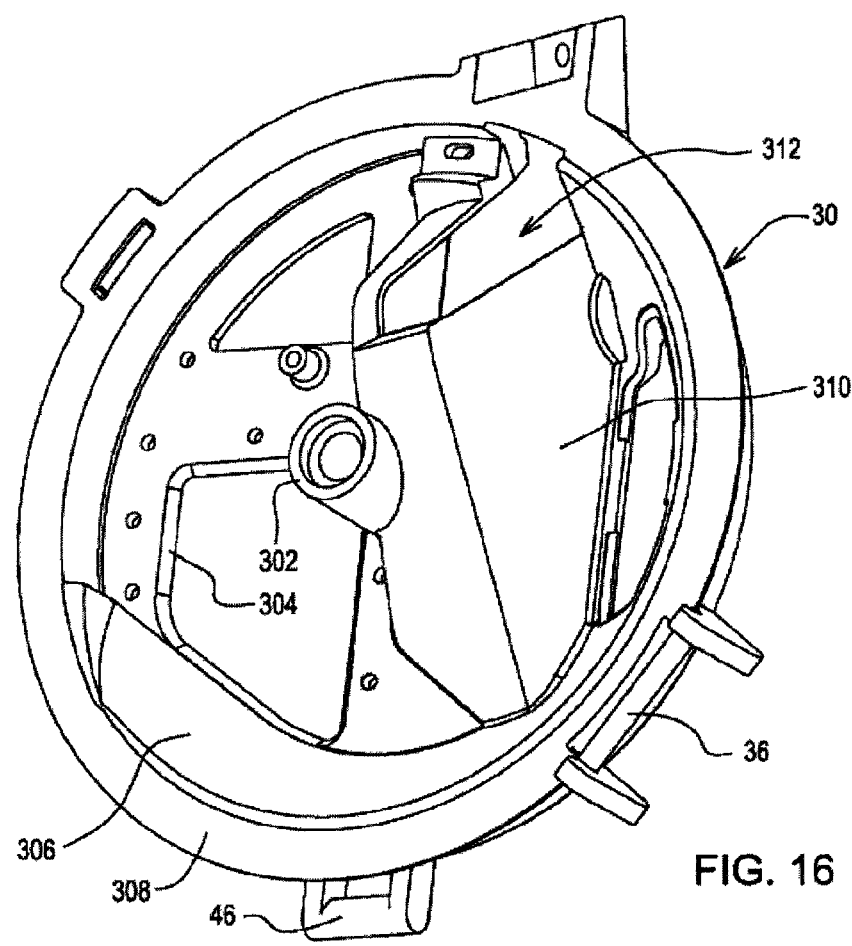
FIG. 16 is a perspective view of the inner side of the seed meter housing.

With reference to FIG. 16, The inside of the housing 30 is shown. The housing includes a central boss 302 for the drive spindle 54. The housing also includes an opening 304 to receive seed from a mini-hopper, not shown, mounted to the outside of the housing and surrounding the opening 304. Below the opening 304, the housing wall forms a ramp 306 extending downward toward the lower end 308 of the housing. The ramp cooperates with the inner surface 108 of the metering member to hold the seed pool 120. The housing includes an inward projection 310 forming a cavity 314 (FIG. 17) on the outside of the housing into which the upper end if the delivery system 400 is placed. The projection is open at the upper end, forming a downward looking opening 312 from the interior of the housing to the exterior. This opening 312 allows the brush belt 424 to access the inner surface of the 108 of the metering member and carry seed from the housing.

Figures 17, 18:
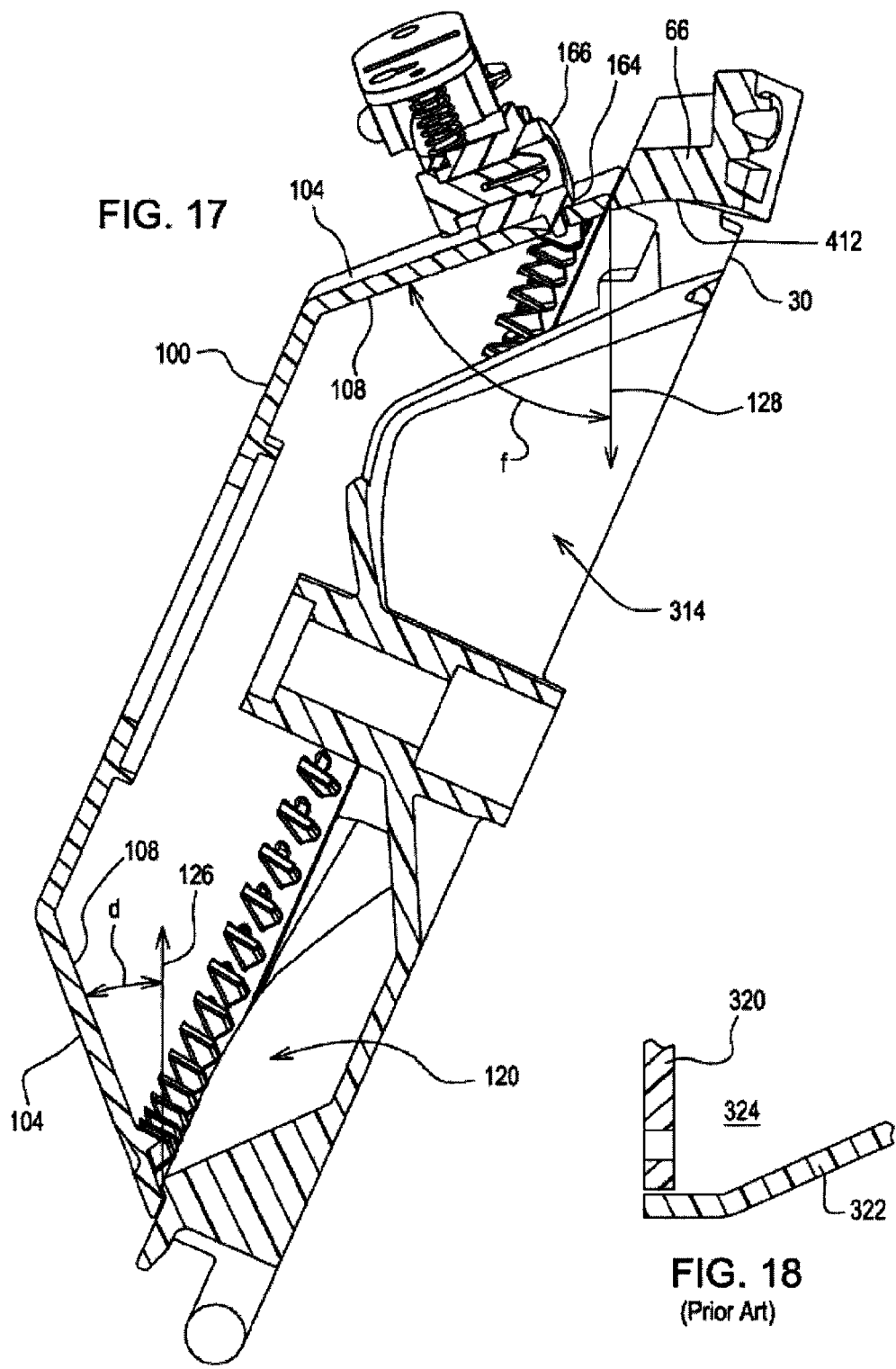
FIG. 17 is a side sectional view of the metering member and meter housing illustrating the seed pool formed by the metering member and housing.
FIG. 18 is side sectional view like FIG. 17 illustrating a prior art seed meter with a disk metering member.

FIG. 17 illustrates the orientation of the metering member and the cooperation of the housing 30 and metering member 100 to form a trough for the seed pool 120 at the lower end of the metering member. FIG. 17 shows the orientation of the metering member when the seeding machine 10 is on level ground. At the lower end of the metering member, the sidewall 104 is inclined to the vertical such that the inner surface 108 is at an angle d to the vertical vector 126. As illustrated in FIG. 17, the inner surface is approximately 21° from vertical. The orientation of the housing adjacent the metering member, forming the other side of the trough, is not critical. Seed from the seed pool 120 sits on top of the inner surface 108 and a component of the force of gravity is perpendicular to the inner surface 108. When operating on a hillside, if the meter is tilted clockwise or counter-clockwise, as viewed in FIG. 17, the inner surface 108 remains inclined and gravity still has a component perpendicular to the inner surface. This is in contrast to a typical disk seed meter shown in FIG. 18 with a vertically oriented disk 320 cooperating with a housing wall 322 for form a seed pool 324. If this meter is tilted counterclockwise as viewed, seed from the pool will still bear against the disk. However, if the meter is tilted clockwise, seed from the pool will fall away from the disk, allowing for decreased metering performance in terms of seed being picked-up by the disk. Evaluation of the meter has shown improved meter performance on a hillside when the angle d is as small as 5° and as large as 75°. Better performance is achieved when the angle d is between 10° and 50° while the optimum performance is in the range of 20° to 40°. This last range provides considerable tilting of the seed meter on a hillside in any direction before performance begins to decrease.

At the upper end of the metering member, at the release position 164, the inner surface 108 has an angle f to a downward vertical vector 128 in the range of 50° to 90° with the closer to 90° being the better for hand-off of seed from the metering member to the brush belt. As shown, the angle f is approximately 68°. The different orientations of the inner surface 108 relative to vertical at the seed trough and at the release position is accomplished with a metering member that is rigid. Such variation is not possible with the flat disk metering member shown in FIG. 18.

As described above, seed is adhered to the apertures 114 in the metering member due to the vacuum applied to the outer surface of the metering member creating a pressure differential on opposite sides of the metering member. As an alternative to vacuum on the outer side of the metering member, the pressure differential can be created by a positive pressure between the housing 30 and the metering member 100. Such a system would require seals between the metering member 100 and the housing 30 to create a positive pressure chamber. In a positive pressure arrangement, the cover 34 only serves as a cover for the rotating metering member.

Figure 5:
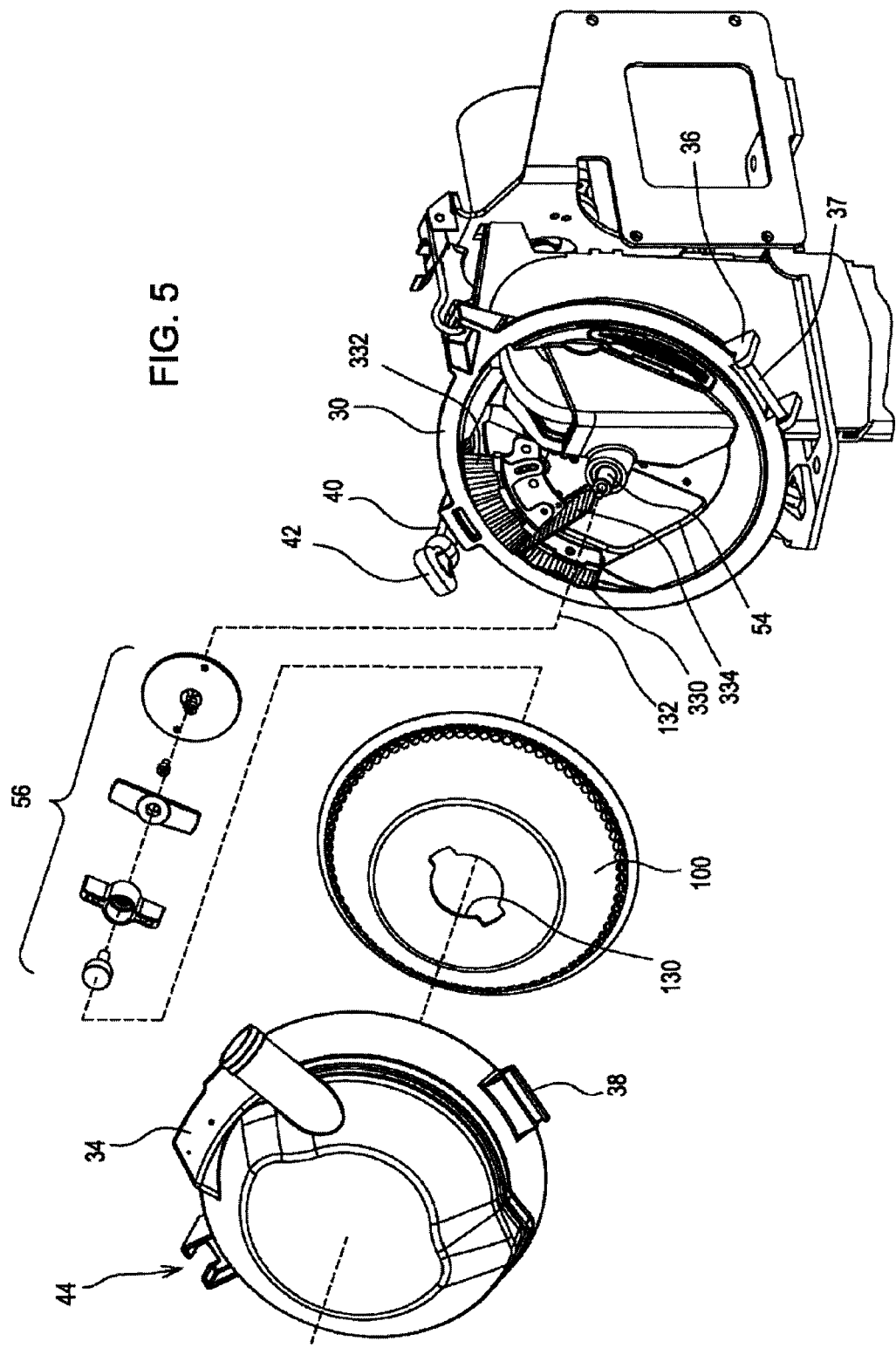
FIG. 5 is an exploded perspective view of the seed meter of FIG. 4.

It is possible that more than one seed will be adhered to a given aperture 114. To prevent more than one seed at a time from being transferred to the brush belt, a pair of doubles eliminators or singulators are attached to the housing 30 along the path of seed from the seed pool to the release position 164. The singulators are in the form of brushes 330 and 332 (FIGS. 5 and 9). Brush 330 has bristles extending substantially axially and brushes seed on the apertures 114 by extending inwardly from the outer edge 106 of the metering member. The bristles of brush 330 are of varying length, to engage the seed at several discrete locations along the length of the brush 330. The brush 332 has bristles extending substantially radially and engaging the inner surface of the metering member sidewall inside of the paddles 116 and extend along the sidewall to the apertures 114. Both brushes 330 and 332 act to slightly disturb seed on the aperture and cause excess seed to fall off. Once removed, the excess seed falls back to the seed pool 120. The brushes can be fixed in position or they can be adjustable to change the degree to which the brushed disturb seed on the metering member. A third brush 334 is shown which extends generally radially of the metering member. The brush 334 serves to define a boundary to the seed pool 120. The brushes 330, 332 and 334 are mounted to the housing 30.

Returning again to FIG. 10, once seed is captured or trapped in the bristles 428, the delivery system controls the movement of seed from the seed meter to the discharge location. The seeds are held in the bristles such that the seeds can not move vertically relative to the bristles 428 or relative to other seeds in the delivery system. Particularly, during travel of the seeds along the vertical side of the delivery system, the seeds are held on at least the top and bottom of the seeds to prevent any relative movement between the seed and the brush belt. Thus, the relative position of the seeds to one another is not affected by dynamics of the planting unit while moving across a field. The seed is carried by the bristles from the upper opening 416 to the lower opening 418 with the movement of the seed controlled at all times from the upper opening to the lower opening.

The lower opening 418 of the delivery system housing is positioned as close to the bottom 446 of the seed trench or furrow 448 as possible. As shown, the lower opening 418 is near or below the soil surface 432 adjacent the seed furrow. The bottom of the delivery system should be no more than one or two inches, (2.5-5 cm) above the soil surface 432. If possible, the lower end of the delivery system should be below the soil surface 432. The housing edge wall 410 forms an exit ramp 434 at the lower opening 418. The lower opening 418 and the ramp 434 are positioned along the curve in the belt path around the pulley 422. The seed, being carried by the bristle's distal ends, increases in linear speed around the pulley 422 as the distal ends of the bristles travel a greater distance around the pulley 422 than does the base member 426 of the belt. This speed difference is shown by the two arrows 440 and 442.

At discharge, the seed has a velocity shown by the vector V. This velocity has a vertical component $V_v$ and a horizontal component $V_H$. The belt is operated at a speed to produce a horizontal velocity component $V_H$ that is approximately equal to, but in the opposite direction of, the seeding machine forward velocity shown by arrow 408. As a result, the horizontal velocity of the seed relative to the ground is zero or approximately zero. This minimizes rolling of the seed in the seed trench.

Seed can be inserted into the brush bristles at essentially an infinite number of positions. This enables the brush to be operated at the speed necessary to produce the desired horizontal velocity component to the seed, independent of the seed population. The seed meter, on the other hand, must be operated at a speed that is a function of both the forward travel speed of the seeding machine and the desired seed population. Because the belt 424 can be loaded with seed at essentially an infinite number of positions, the belt speed can be operated independently of the seed meter speed. This is not the case with other seed delivery systems, such as that disclosed in U.S. Pat. No. 6,681,706 where the delivery system of FIG. 2 has a belt with flights to carry the seed. The belt speed must be timed to the seed meter speed to ensure that one or more flights pass the seed meter for each seed that is discharged from the meter.

While it is desirable to match the seed rearward velocity to the seeding machine forward velocity to minimize seed relative velocity to the soil, with some seed types, it may be necessary to operate the brush belt at a different speed to ensure the seed is discharged from the brush bristles.

Figure 19:
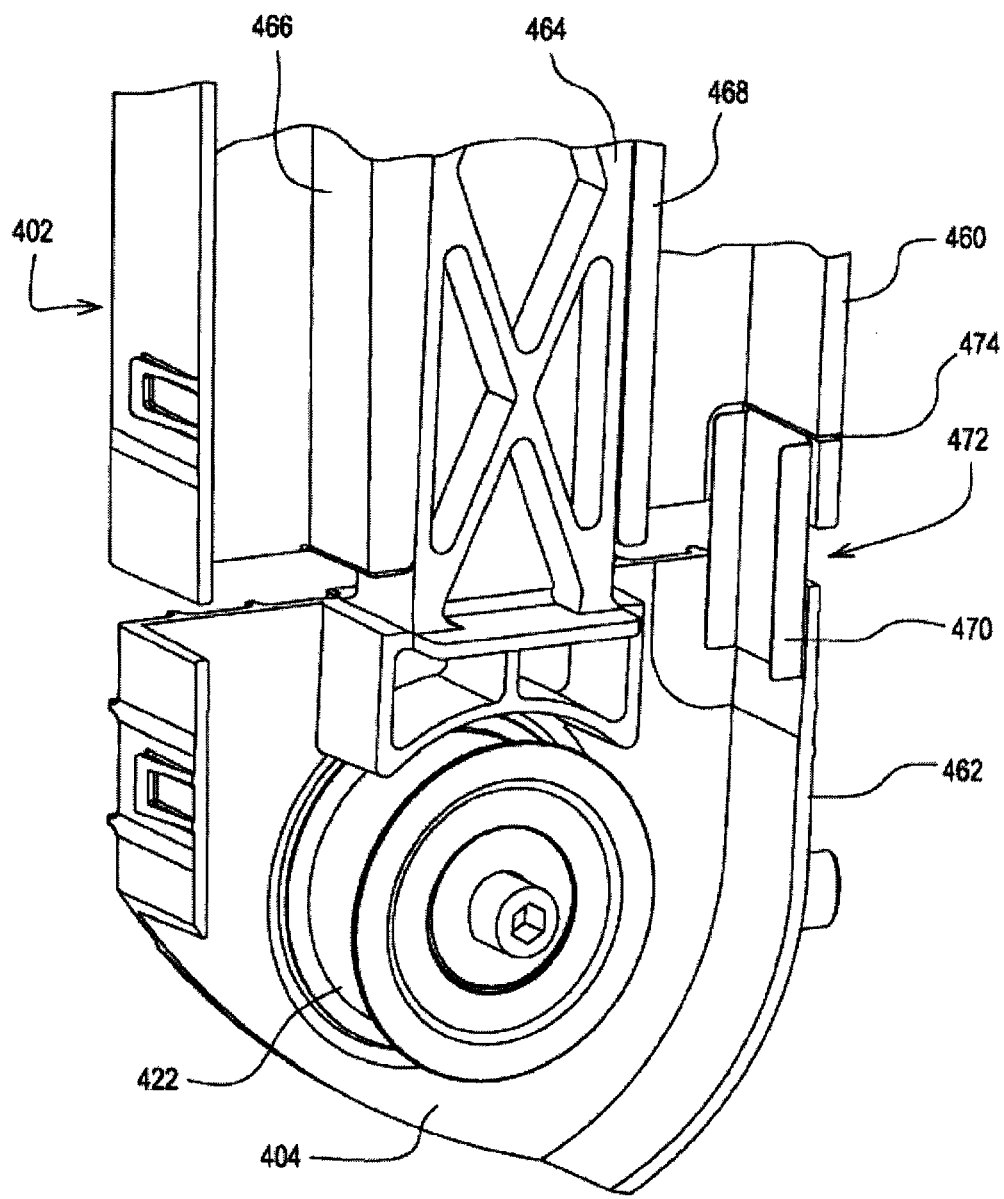
FIG. 19 is a perspective view of the lower end of the delivery system.

The interior of the lower portion of delivery system housing is shown in FIG. 19. The delivery system housing 402 is a two-piece housing having an upper housing member 460 and a lower housing member 462. The lower housing member carries the lower pulley 422. The lower housing member has an upwardly extending rod portion 464 that slides within a channel formed by walls 466 and 468 in the upper housing member. Springs, not shown, push downward on the rod portion 464 to bias the lower housing member downward. The brush belt 424, wrapped about the pulleys 420 and 422, holds the upper and lower housing members together. The belt 424 is tensioned by the springs acting on the rod portion 464. A U-shaped metal strip 470 is attached to the upper housing member 460 and bridges the gap 472 between the upper and lower housing members to provide a continuous surface for holding seed in the housing between the upper opening 416 and the lower opening 418. The metal strip has a tab at the upper end thereof bent over and inserted into a slot 474 in the upper housing member 460 to hold the metal strip 470 in place. If needed, a fastener, such as a nut and bolt, may be placed through the rod portion 464 and the upper housing member 460 to fix the upper and lower housing members together.

Figure 20:
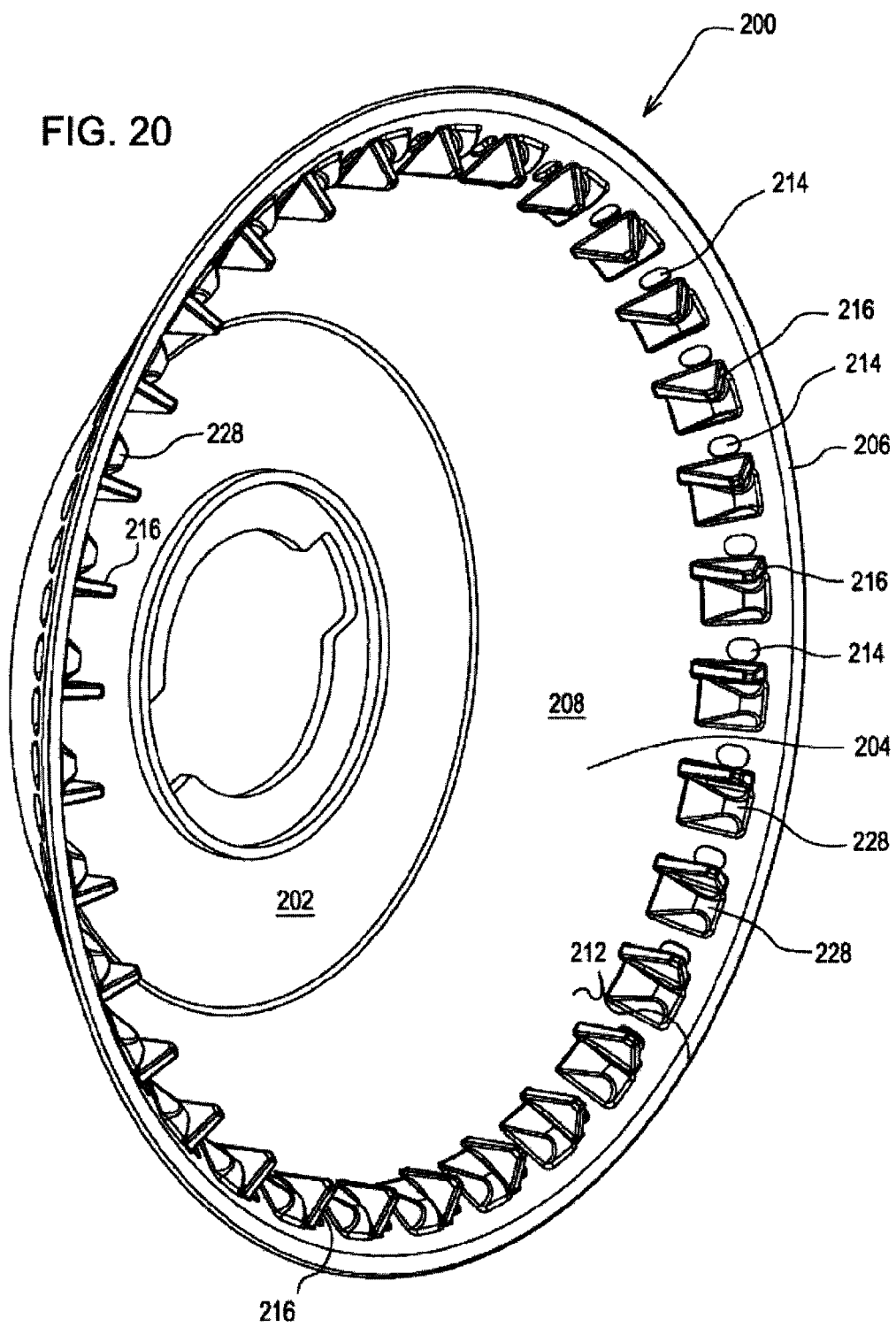
FIGS. 20 and 21 are perspective views of an alternative metering member.
Figure 21:
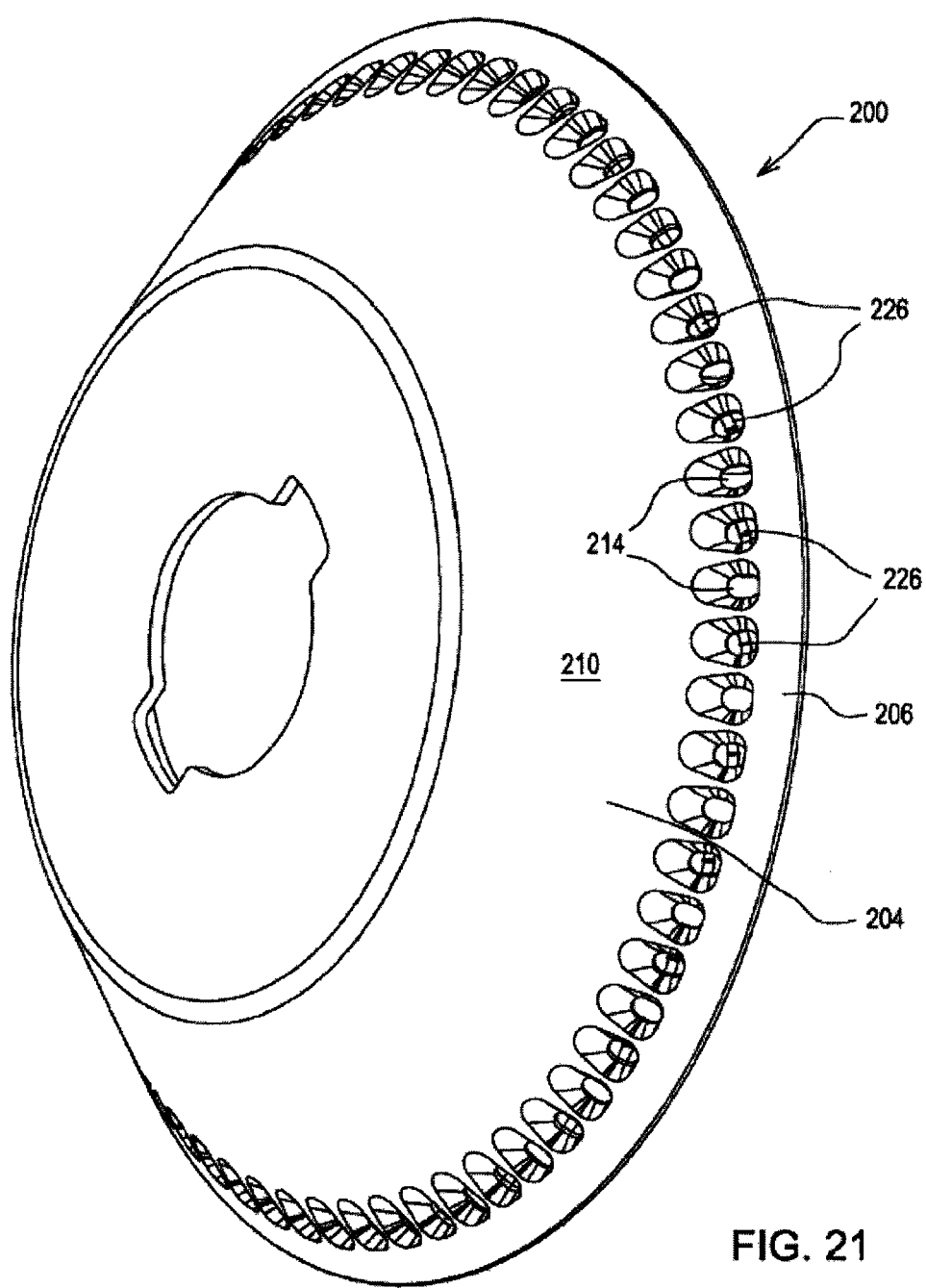
Figure 22:
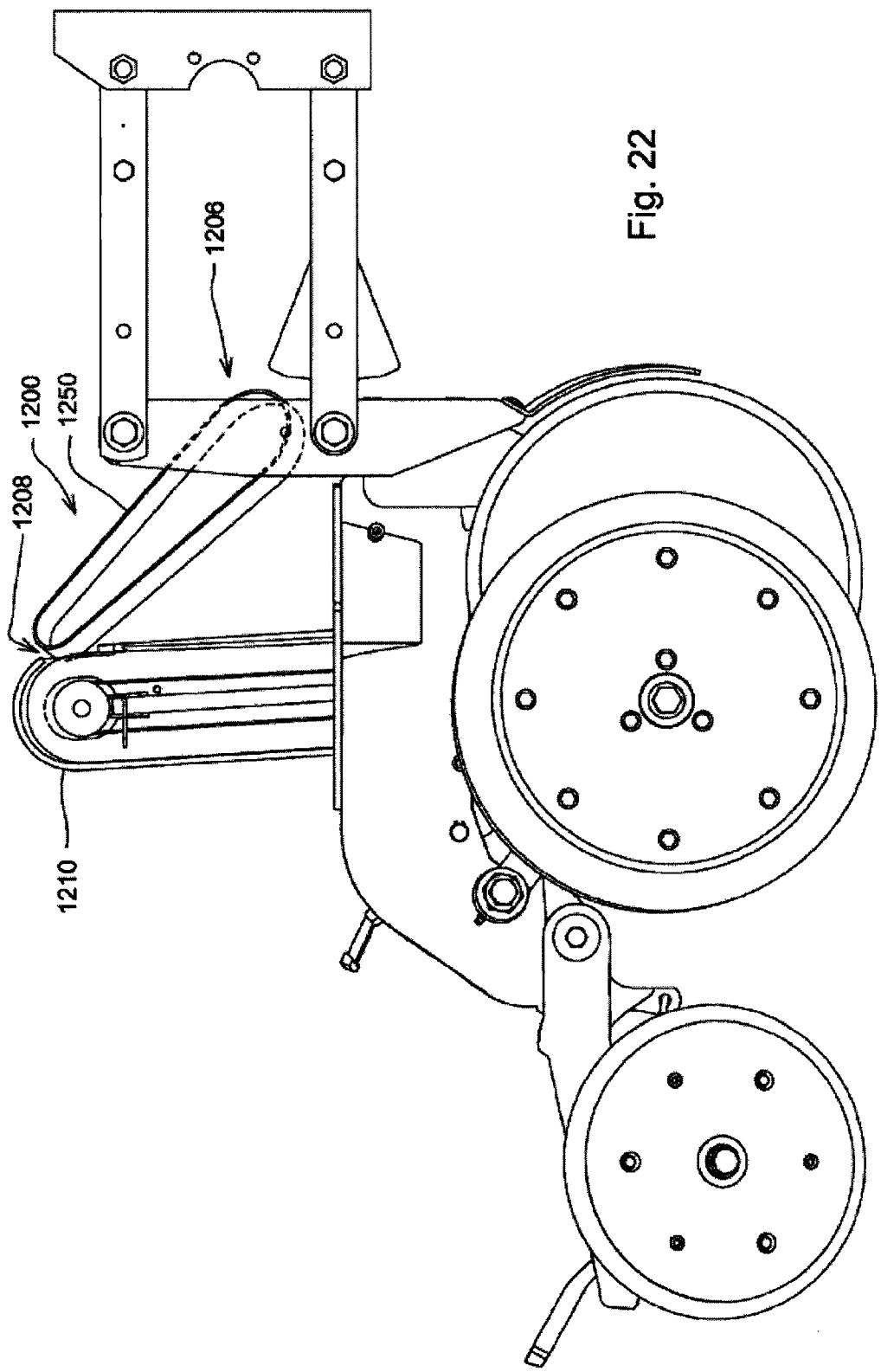
FIG. 22 is a schematic side view of another arrangement of the seed meter and seed delivery system.
Figure 23:
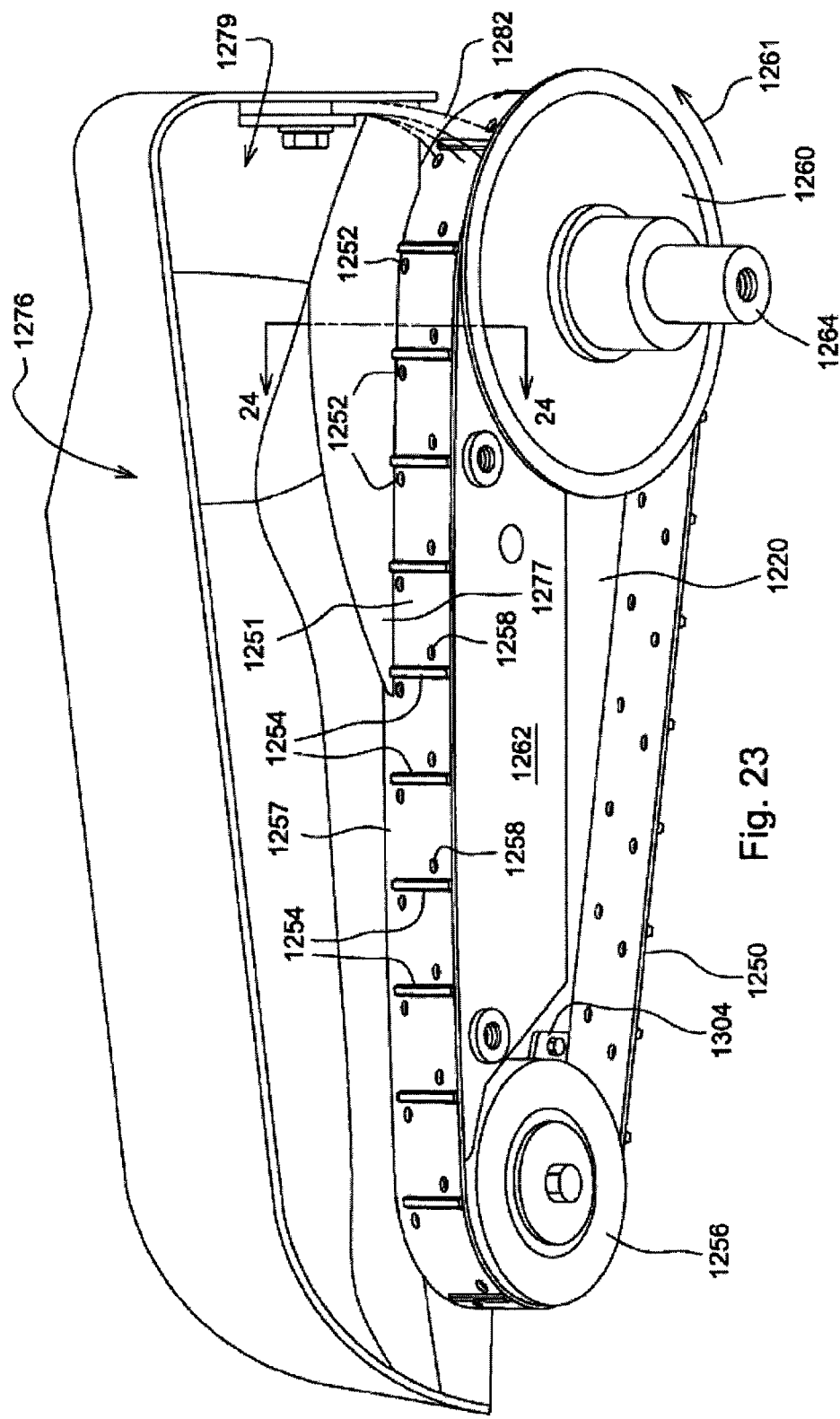
FIG. 23 is a perspective view of the seed meter of FIG. 22 partially disassembled.
Figure 24:
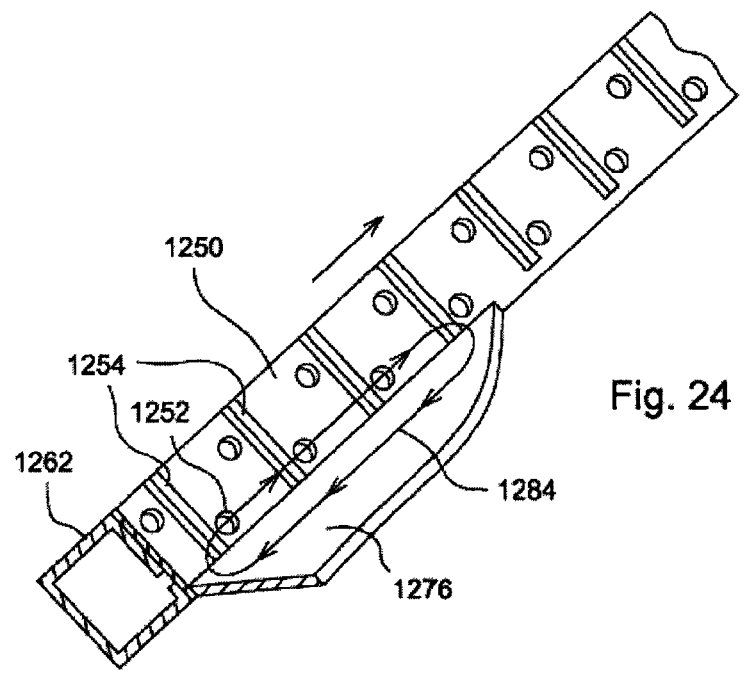
FIG. 24 is perspective view of the seed meter as seen along the line 24-24 of FIG. 23.
Figure 25:
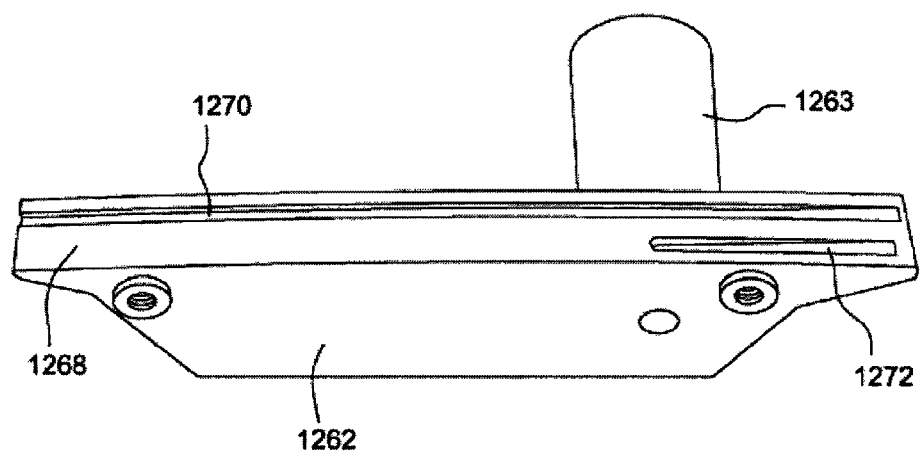
FIG. 25 is a perspective view of the vacuum manifold of the seed meter of FIG. 23.

Different metering members may be used for different seed types. The metering member 100 is intended for soybeans and other crops planted with a fairly close seed spacing. Corn, which is planted at a greater seed spacing uses a metering member 200 shown in FIGS. 20 and 21. Metering member 200 is constructed in a similar fashion as metering member 100 and like components are given the same reference numeral with the addition of 100. However, metering member 200 has half the number of apertures 214 as the metering member 100. To avoid the need to replace the ejector 166 when changing metering members, the metering member 200 has recess 226 extending into the sidewall 204 on the outer surface 210 of the sidewall between each aperture 214. The recesses 226 provide clearance for the projections 168 of the ejector 166 that are arranged to be inserted in each aperture 114 of the metering member 100. The recesses 226 are not open to the inner surface 208 of the sidewall 204. Thus there are additional projections 228 on the inner surface of the sidewall 204 between the apertures 214. Alternatively, the projections 228 and the paddles 216 can be formed as a single projections extending from the inner surface 208.

The blocking member or guide is shown in another arrangement of the seed meter and delivery system described in connection with FIGS. 22-31 from the parent application, U.S. patent application Ser. No. 12/363,968, filed Feb. 2, 2009. with reference to FIG. 22, a belt meter 1200 is shown schematically to illustrate the relationship of the belt 1250 relative to the row unit structure. The belt 1250 lies in a plane that is inclined relative to all three axes, that is the plane of the belt is inclined relative to a vertical fore and aft plane, inclined relative to a vertical transverse plane and inclined relative to a horizontal plane. Furthermore, the seed pickup region 1206 is positioned at the lower end of the belt 1250 while the seed release position or location 1208 is located at the upper end of the belt 1250. In the embodiment shown in FIG. 22, the seed is removed from the belt 1250 at the release location by a seed delivery system 1210. The seed delivery system 1210 is like seed delivery system 400 described above containing a brush belt 1312 to grip and carry seed. The seed delivery system 1210 moves the seed from the seed meter belt to the lower end of the row unit between the furrow opening disks where it is deposited into the furrow formed in the soil. The seed meter 1200 is described fully below with reference to FIGS. 23-30.

The seed meter 1200 has a frame member 1220 in the form of a plate which is mounted to the row unit frame in a suitable manner. The frame member 1220 supports the upper idler pulley 1256 and the lower drive pulley 1260 about which the belt 1250 is wrapped. A gearbox and drive motor (not shown) are coupled to the shaft 264 to drive the pulley 1260 and belt counterclockwise as viewed in FIG. 23 and shown by the arrow 1261. The frame member 1220 also carries a vacuum manifold 1262 having a hollow interior vacuum chamber 1266. A vacuum port 1263 extends from the opposite side of the vacuum chamber through the frame member 1220. The manifold 1262 has an outer wall 11268 (FIG. 25) containing a main slot 1270 extending the length of the outer wall. A secondary slot 11272 extends only a short portion of the length of the outer wall.

The belt 1250 has an outer seed engaging face or side 11251. The belt 1250 includes a row of first apertures 1252 which overlie the slot 1270 in the manifold 1262. The apertures 1252 to extend through the belt, allowing air to flow through the belt. The belt further has a plurality of features 11254 formed as ribs extending from the seed face 1251. The features 1254 each for a confronting face 1255 shown in FIG. 29 facing in the travel direction of the belt. In this embodiment, the feature 1254 forms the confronting face 1255 extending outward from the seed side 1251 of the belt. In the embodiment shown, the features 1254 do not extend laterally to both side edges of the belt, but leaves a flat edge zone 1257 along one edge of the belt. An optional second row of apertures 1258 in the belt are positioned to pass over the secondary slot 1272 in the manifold outer wall 1268. The apertures 1258 are only in communication with the vacuum chamber 1266 for the short portion of the path of the apertures 1258 over the slot 1272.

A housing 1276 is attached to the frame member 1220 and closely positioned to the belt 1250. A portion 1277 of the housing 1276 overlies the flat edge zone 1257 of the belt. The housing 1276, the belt 1250, and a cover 1278 (shown in FIG. 28) form a small chamber 1279 which holds a pool of seed 1280. A brush 1282 mounted to the housing 1276 sweeps across the face 1251 of the belt and seals the chamber 1279 at the location where the belt enters the chamber to prevent seed from escaping the chamber 1279. Seed enters in the chamber 1279 through a suitable port, not shown, in the housing 1276 or housing cover 1278.

The belt 1250 and housing 1276 form a V-shaped trough for the seed pool that extends uphill in the direction of belt travel. The confronting faces 1255 formed by the features 1254 of the belt engage the seed in the pool to agitate the seed creating a circular flow of seed as shown by the broken line 1284 of FIG. 24. Since the belt forms one side of the V-shaped trough, seed will always remain in contact with the belt regardless of tilt or inclination of the planter, as long as sufficient seed is present in the seed pool. An advantage of the seed meter is that when the vacuum shut off, seed on the belt falls back into the seed pool. This is in contrast to disk meters where a portion of the seed on the disk above the seed tube will fall to the ground upon vacuum shut-off.

Figure 26:
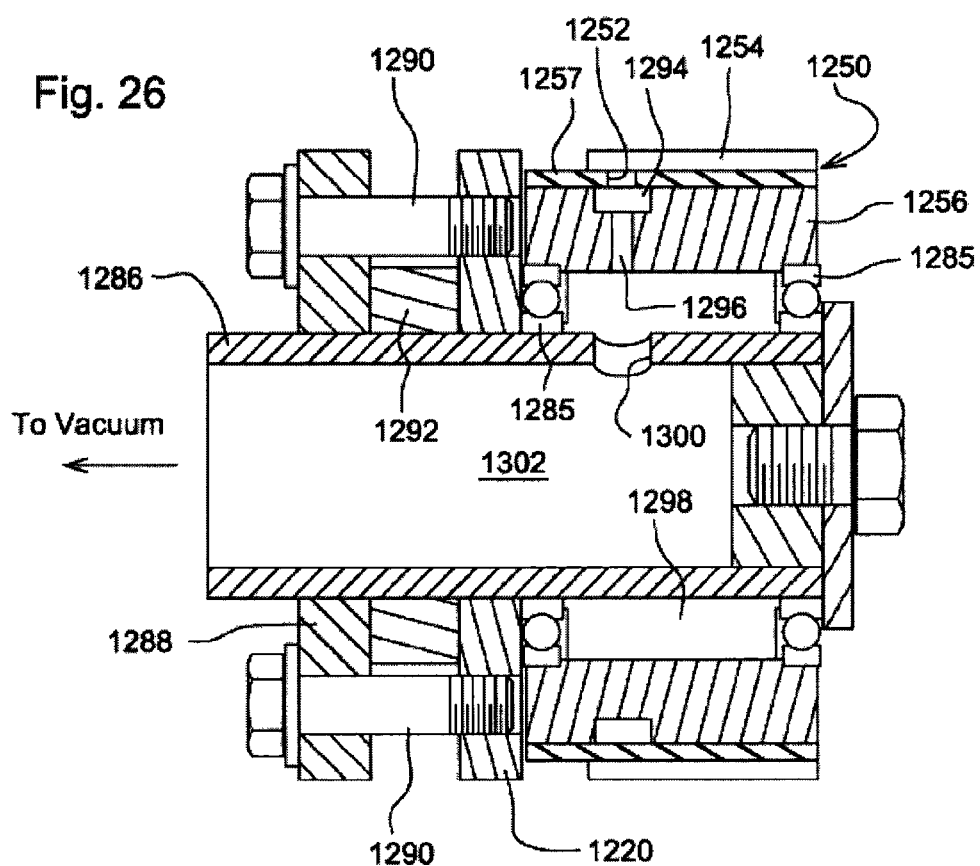
FIG. 26 is a sectional view of the idler pulley mounting structure of the seed meter of FIG. 23.
Figure 27:
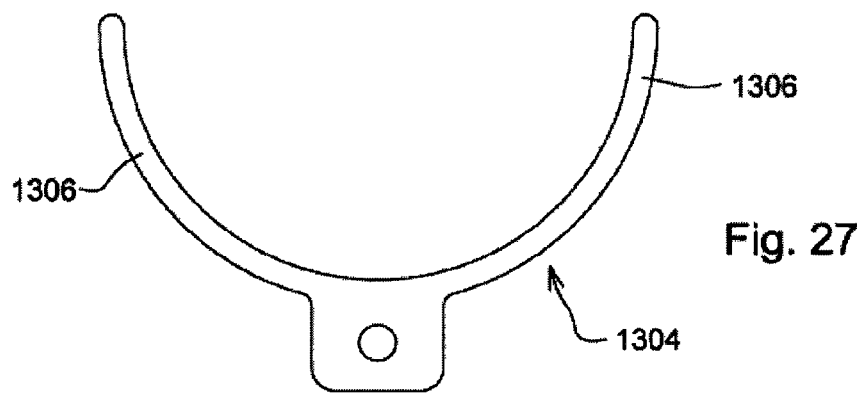
FIG. 27 is a plan view of a vacuum control member in the seed meter of FIG. 23.
Figure 28:
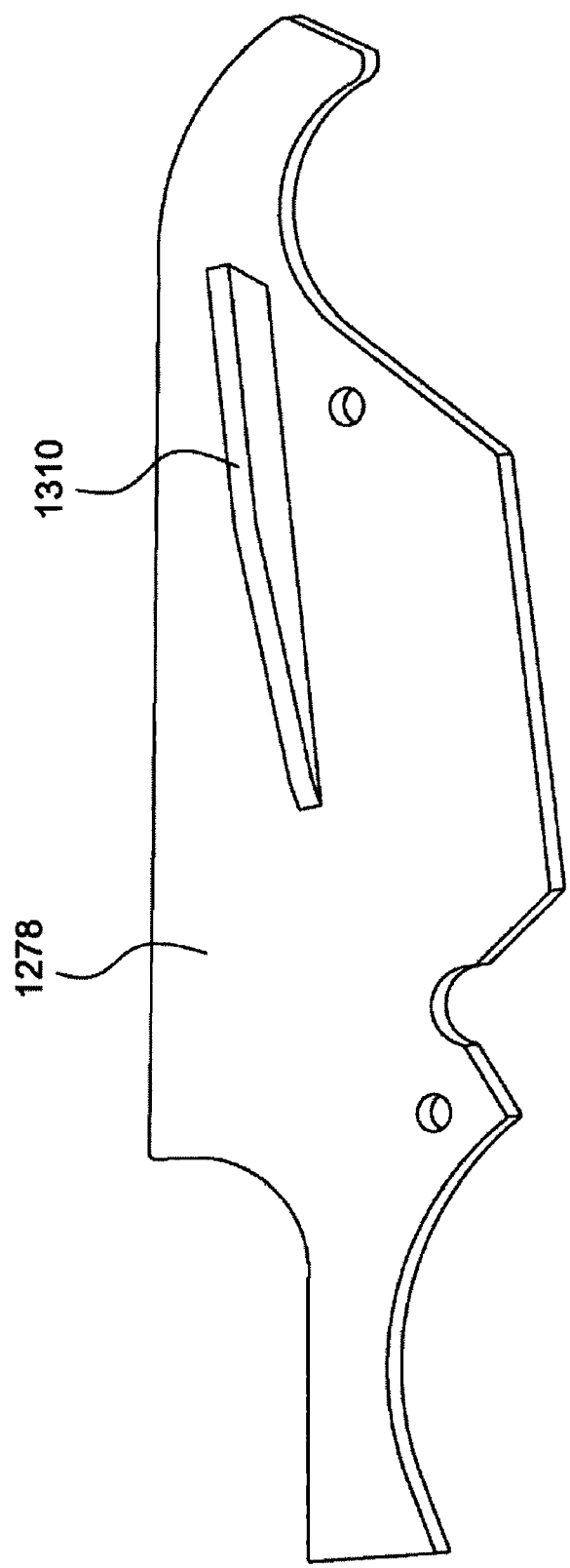
FIG. 28 is a perspective view of the seed meter housing cover of the seed meter of FIG. 23.

The idler pulley 1256 is supported by a bearing set 1285 on a tube 1286 (FIG. 26). A flange 1288 welded to the tube 1286 is attached to the frame member 1220 by bolts 1290. A spacer 1292 is positioned between the flange and frame member 1220. The idler pulley 1256 has a groove 1294 in its outer periphery which is in line with the belt apertures 1252. Channels 1296 extend radially through the pulley 1256 to an annular chamber 1298 surrounding the tube 1286. An opening 1300 in the tube 1286 provides communication between the chamber 1298 and the hollow interior 1302 of the tube. The tube is connected to the vacuum source whereby the vacuum is applied to the apertures 1252 in the belt as the belt travels over the pulley 1256. A fork 1304 is attached to the frame member 1220 with tines 1306 seated in the groove 1294 in the idler pulley. The tines filled the groove 1294 to cut off the vacuum and create the seed release location 1208. The tines 1306 extend from the seed release location to the vacuum manifold in the direction of rotation of the idler pulley to seal the vacuum chamber and the groove in the idler pulley.

Figure 29:
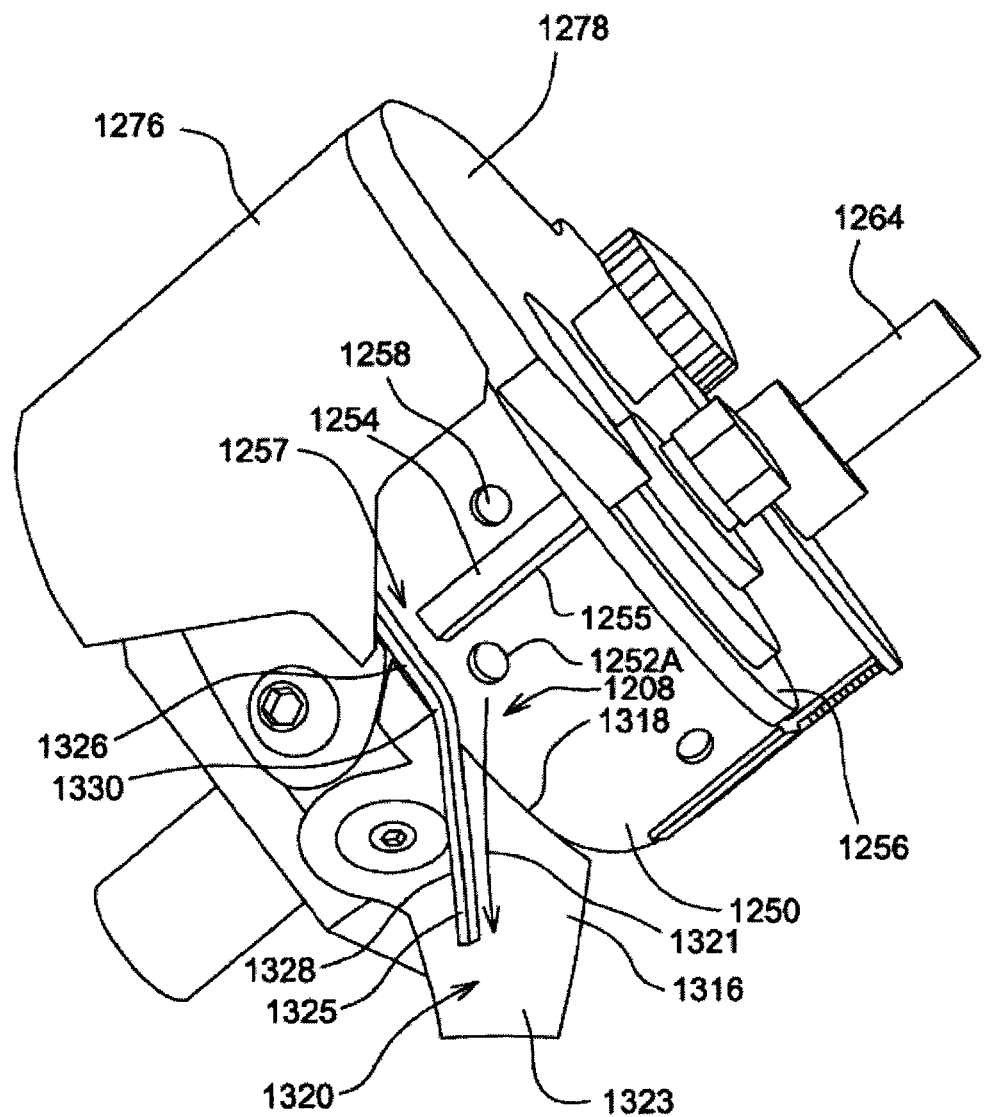
FIG. 29 is perspective view of the upper end of the seed meter of FIG. 23.
Figure 30:
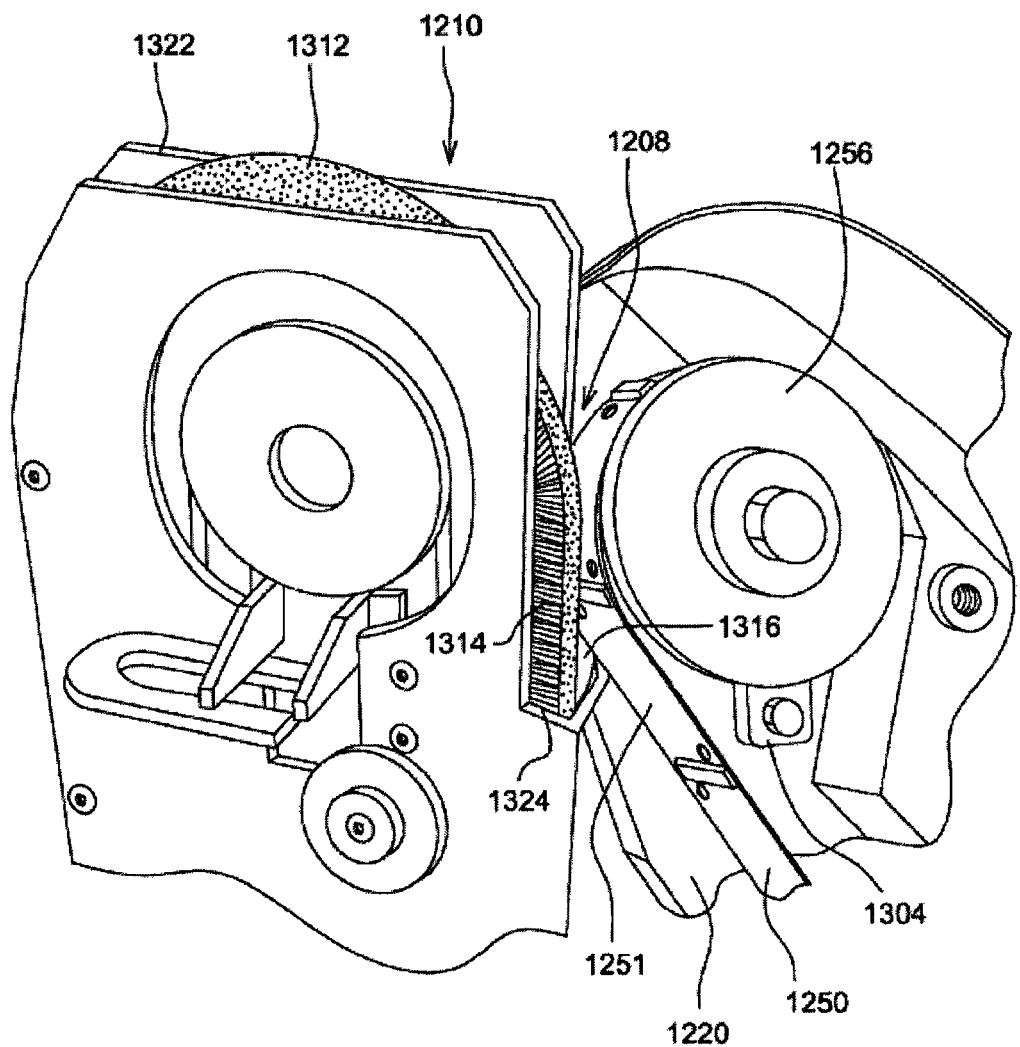
FIG. 30 is a perspective view showing the seed meter of FIG. 23 in relation to the seed deliver system.

The housing cover 1278 mounts to the manifold and covers the open side of the housing 1276 as shown in FIG. 29. A doubles eliminator 1310 is mounted to the housing cover and, when assembled, lies on top of the belt 1250. The doubles eliminator 1310 is roughly wedge-shaped and progressively increases in width in the travel direction of the belt to increase its coverage over the apertures 1252. The doubles eliminated 1310 causes doubles or multiples of seed to be removed from the belt resulting in a single seed covering each aperture 1252.

In operation, as the belt rotates, the confronting face 1255 engage and agitate seed in the seed pool at the bottom of the housing 1276. Seed from the seed pool will be adhered to the belt at each aperture 1252 due to the vacuum applied to the apertures from the interior of the manifold 1262 or by positive air pressure on the seed side of the belt. By virtue of the main slot 1270, the seeds will continue to be retained on the belt as the belt travels from the seed pick-up region 1206 to the idler pulley 1256. Due to the groove in the idler pulley, the vacuum is maintained on the apertures as the belt travels around the pulley until the seed and the aperture reaches the tine 1306 of the fork 1304. Upon reaching the tine 1306, the vacuum is terminated and the seed is released from the belt 1250. Alternatively, the seed can be mechanically removed from the belt or removed by a combination of vacuum termination and mechanical removal or the seeds can be removed mechanically while the vacuum is still applied.

The second row of apertures 1258 will also operate to retain a seed therein while the aperture 1258 travels over the shorter slot 1272. By picking up seed, the apertures 1258 act to further agitate the seed pool. In addition, when the apertures 1258 reach the downstream end 273 of the secondary slot 1272, the seed is released from the belt. The release location from the aperture 1258 causes the seed to pass over one of the apertures 1252 as the seed falls. If the aperture 1252 failed to pick-up a seed and is empty, the falling seed may be retained thereon. If the aperture 1252 is not empty, but instead picked-up multiple seeds, the falling seed may collide with the multiple seeds and assist in removing one or more of the multiple seeds. In this fashion, the falling seed operates to avoid errors in terms either no seed or multiple seeds on an aperture 1252.

At the seed release position 1208, the seed is transferred from the metering belt 1250 to the seed delivery system 1210. The seed delivery system 1210 includes an endless member also wrapped around pulleys and contained within a housing 1322. The housing has an upper opening 1324 through which seed is admitted into the delivery system. The endless member is shown in the form of a brush belt 1312 having bristles 1314 that sweep across the face 1251 of the belt 1250 to remove the seed therefrom. At the seed release position 1208, a transition plate 1316 is positioned adjacent the belt 1250. The transition plate has a curved first edge 1318 abutting the edge of the belt as the belt travels around the idler pulley. The brush belt bristles will engage a seed in the aperture 1252A at the location shown in FIG. 19 and will sweep the seed off the belt and across the face 1320 of the transition plate 1316 in the direction of the arrow 1321. The confronting face 1255 behind the aperture 1252A serves as a back stop to prevent the brush from knocking the seed off the metering belt. The confronting face 1255 pushes the seed into the brush bristles. The downward extending tab portion 1323 of the transition plate projects into the housing of the delivery system 1210 to allow the brush to continuously trap seed as the seed moves off the belt 1250, over the transition plate 1316 and into the interior of the delivery system housing where the seed is trapped by the brush bristles and the interior surface of the delivery system housing 1322. A guide 1325 projects from the surface of the transition plate to guide the seed and keep the seed from being swept off the meter belt prematurely. The guide forms an upstanding wall having a first portion 1326 adjacent the path of seed on the belt 1250 immediately prior to the release position 1208. A second portion 1328 of the upstanding wall extends in the direction of seed travel in the brush belt 1312. Seed must pass the corner or bend 1330 in the upstanding wall before it can be moved off the meter belt 1250 by the seed delivery system.

The guide 1325 and blocking member 162 ensure seed entry into the brush belt in a consistent manner and in the same location across the width of the brush belt. This consistent hand-off of seed from the seed meter to the seed delivery system helps to improve placement accuracy of the seed in the furrow in the soil.

As also noted above, certain seeding machines may include various different systems for transport of seed from a seed pool to a planting position. For example, a seed meter may include a metering member, which may transport seed from a seed pool around a generally circular (or other) path. At a release position, the seed may be ejected from the metering member for transport along a seed path (e.g., in a different direction) by a seed delivery system. Because such a delivery system (or others)—as well as the seed it carries—may be subject to wear during operation, it may be useful to provide a suitably designed wear liner to protect portions of the delivery system. In various configurations, such a liner may help to reduce wear on various delivery system components, as well as wear on the seed being transported by the delivery system. In certain configurations, in light of the expected wear on the liner (which wear might otherwise directly impact the seed and/or various other delivery system components), such a liner may be configured to be replaceable without need for specialized tools, equipment or techniques.

In certain embodiments, a seed delivery system may include a brush (or other) belt for transporting seed from the release position at the metering member (or another location) to a planting position. (Discussion of various insert configurations below may include discussion of a brush belt delivery system. It will be understood, however, that the disclosed insert may also be utilized with various other seed transport systems, including other belt systems.) In such a configuration, the bristles of the brush belt (or the moving components of another transport mechanisms) may cause wear to the delivery system through contact between the bristles, seeds, or other components, and various surfaces or features of the delivery system (e.g., various interior surfaces of a seed delivery system housing). Similarly, wear to the delivery system may result from debris (e.g., dirt, rocks, plant matter, and so on) that is carried into and through the delivery system housing by the bristles (or other components).

Wear to the seed itself may also occur through contact between the seed and the delivery system housing, various debris, or various other components. For example, as seed is carried through the delivery system by a brush belt (or other mechanism) the seed may come into contact with various surfaces (or other features) of the interior of the delivery system housing. As such, the seed itself, or various coatings thereof (e.g., fertilizer, anti-pathogen, or other coatings) may be exposed to detrimental wear. Loss of seed coating through such wear may, for example, be particularly prevalent in humid environments (although coating loss may be a concern in other environments as well). A wear liner oriented along the path of the brush belt or other transport mechanism and of the seed (e.g., a wear liner configured to include a wear liner insert for the delivery system housing) may address these and other issues.

Figure 31:
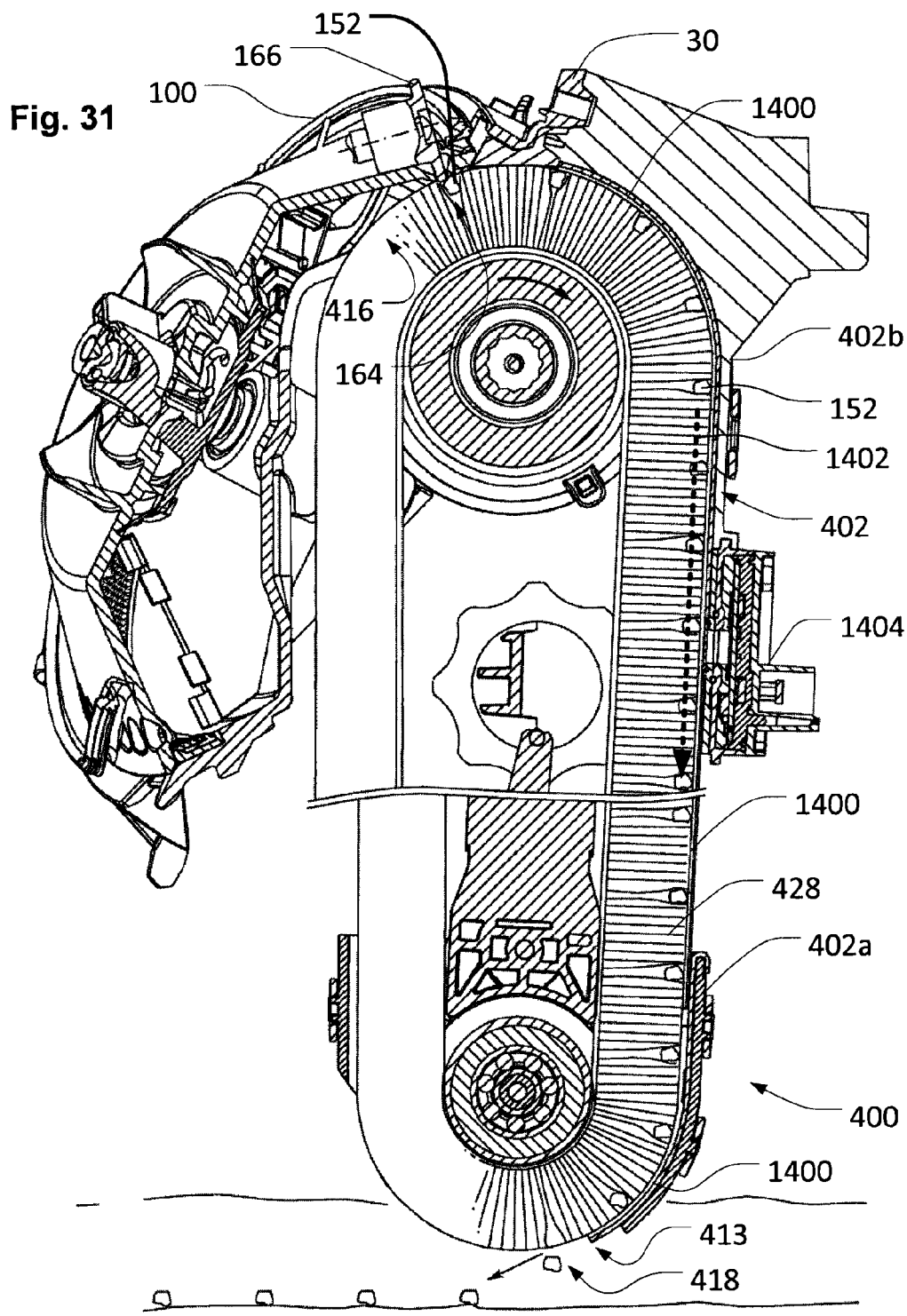
FIG. 31 is a side sectional view of another embodiment of the metering member and seed delivery system.
Figure 32:
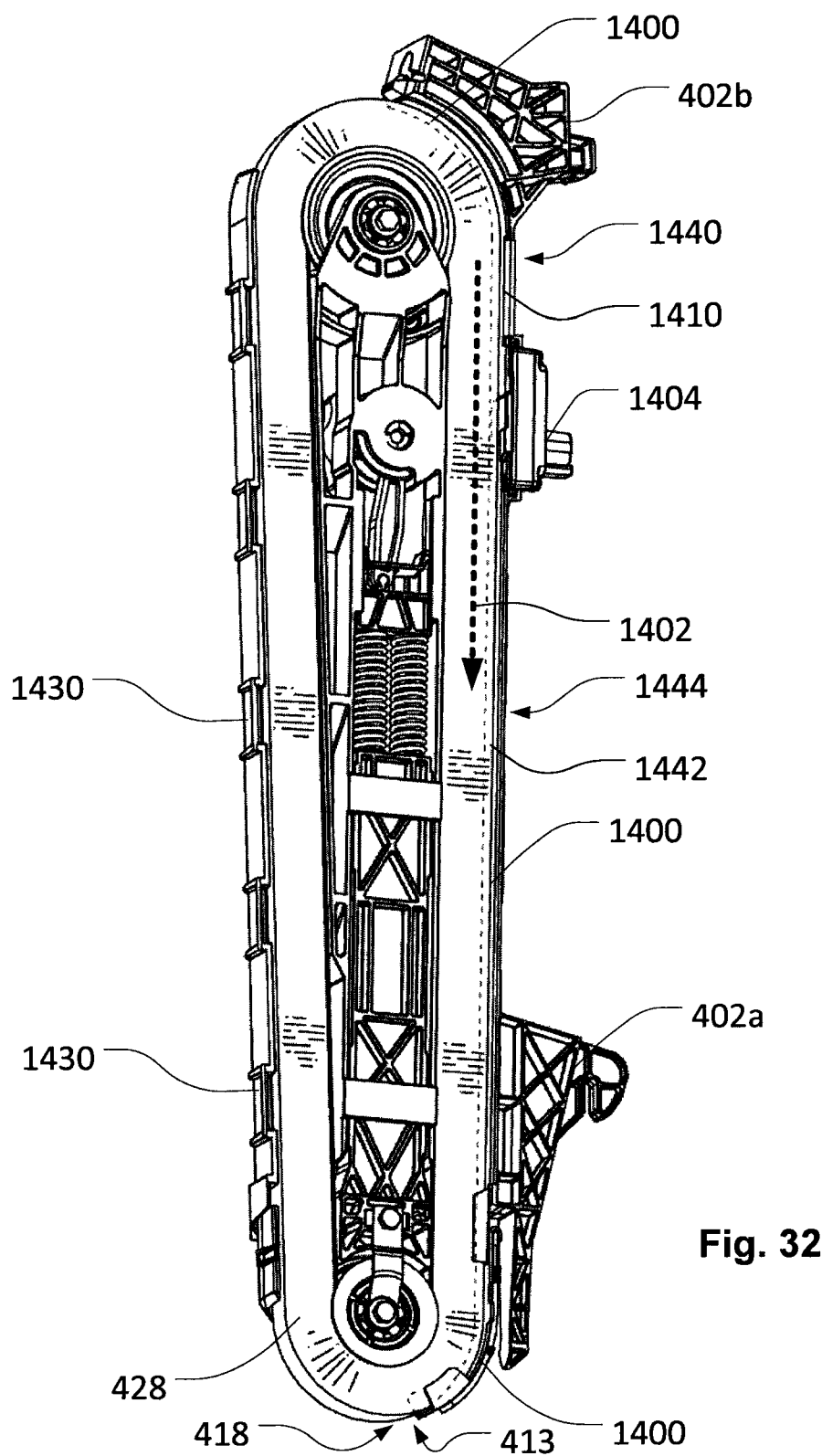
FIG. 32 a perspective view of certain internal components of the seed delivery system of FIG. 31, including a wear liner and seed sensor.

Referring now to FIGS. 31 and 32, in one embodiment of planting unit 14, delivery system 400 may include housing 402 partially enclosing brush-belt bristles 428, which may generally travel in a clockwise direction (as depicted in FIG. 31) within housing 402. Upper opening 416 may be formed in upper housing portion 402b in order to allow seed to enter housing 402 (e.g., from metering member 100). Bristles 428 may extend through opening 416 in order to receive seed from metering member 100 (e.g., as seed 152 is ejected from metering member 100 by ejector 166 at release position (or hand-off location) 164). Seed 152 may then be carried by bristles 428 through housing 402 along seed path 1402 (a portion of which is indicated by arrow in FIGS. 31 and 32). At discharge location 413 (e.g., at lower housing portion 402b) seed 152 may be discharged from housing 402 (and bristles 428) for deposit into a furrow opened by furrow opening disks 28. In certain embodiments, seed sensor 1404 may be included along seed path 1402 (or elsewhere) in order to sense passage of seed 152 through delivery system 400. (It will be understood, in light of the discussion herein, that various other configurations may also be possible. For example, housing portion 402b may be formed as a separate component from housing portion 402a (or other portions of housing 402), bristles 428 may be replaced with another seed transport mechanism, and so on. Further, in various configurations delivery system 400 may be configured with a generally vertical orientation (as depicted in the various figures), a generally horizontal orientation, or otherwise. As such, housing portion 402b may not necessarily be above housing portion 402a, in which case the portions may not necessarily be actual "upper" or "lower" portions with regard to the orientation of delivery system 400. Similarly, in various configurations, opening 416 may be viewed generally as an inlet opening, rather than necessarily an "upper" opening.)

As can be seen in FIG. 31, wear liner insert 1400 may extend along seed path 1402 within the interior of housing 402, in order to protect housing 402, seed 152, and various other components of planting unit 14 from wear (e.g., to protect against detrimental contact between seed 152, bristles 428, housing 402, various debris carried by bristles 428, and so on). In various embodiments, insert 1400 may be configured to be easily replaceable so that as a first insert 1400 reaches the end of its useful life, the first insert may be easily removed from delivery system 400 and a second insert 1400 installed in its place.

Wear liner insert 1400 may be manufactured in various known ways and may be composed of various materials or combinations of materials, including various metals, plastics, composite materials, and so on. In certain embodiments, insert 1400 may be manufactured from stamped, pressed or otherwise manipulated sheet metal. In certain embodiments, insert 1400 may be manufactured to include a steel substrate (e.g., hardened 1075 steel) or a stainless steel substrate (e.g., 304 stainless steel). In certain embodiments, various coatings (e.g., as overlaid over a metal or other substrate) may be utilized, in order to provide a suitable wear surface for contact with bristles 428 or seed 152. In certain embodiments, for example, chrome plating may be utilized. It has been found, for example, that chrome plating may be effective in preventing transfer of seed coating material from seed 152 to insert 1400.

As discussed in greater detail below, in various embodiments, insert 1400 may be formed from multiple distinct pieces or sections. In such embodiments, the various pieces of insert 1400 may be formed from (or coated with) the same material(s) or may be formed from (or coated with) different materials. (Likewise, in a single-piece or other configuration, various connected portions of insert 1400 may be formed from (or coated with) various materials.) For example, in the case of a three-piece insert 1400, two pieces (e.g., an upper and middle piece) may be formed of hardened steel, and a third piece (e.g., a lower piece) may be formed of stainless steel, with all three pieces plated with chrome (or otherwise coated). Such a varied configuration may be useful, for example, in light of the potential for different type or intensity of contact between various system components and seed 152 as seed 152 moves through delivery system 400. For example, due to centrifugal inertia, when seed 152 moves through a curved portion of seed path 1402 seed 152 may be more likely to contact insert 1400 (or to contact insert 1400 with greater force) than when seed 152 moves through a straighter portion of seed path 1402. As such, for example, upper and lower sections of insert 1400 (e.g., sections covering curved portions of seed path 1402) may be formed from (or coated with) one set of materials and a middle section of insert 1400 (e.g., a section covering mainly straight portions of seed path 1402) may be formed from (or coated with) another set of materials.

Figures 33, 34, 35:
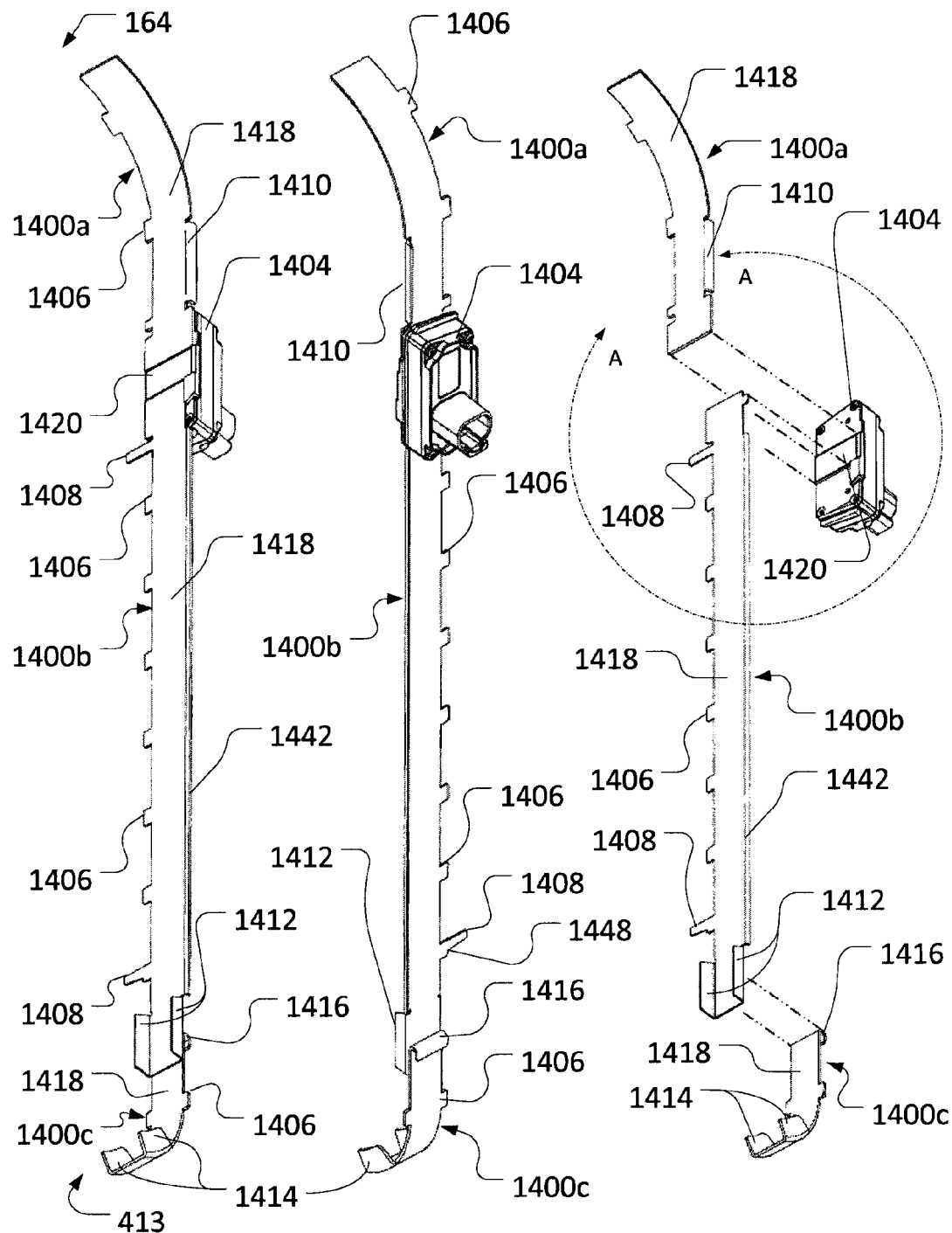
FIG. 33 is a perspective view of the wear liner and seed sensor shown in FIG. 32.
FIG. 34 is another perspective view of the wear liner and seed sensor shown in FIG. 32.
FIG. 35 is an exploded perspective view of the wear liner and seed sensor shown in FIG. 32.

Referring now to FIGS. 33-35, insert 1400 is depicted as being formed from three distinct sections. Upper insert section 1400a, for example, may extend along the interior of housing 402 from near seed release position 164 to an upper portion of seed sensor 1404. Middle insert section 1400b may extend along the interior of housing 402 from a lower portion of seed sensor 1404 to lower insert section 1400c. Lower insert section 1400c may then extend from middle insert section 1400b toward seed discharge location 413. As depicted in FIGS. 33-35, inserts 1400a, 1400b, and 1400c may each be formed as elongated strips, although other configurations may be possible. In certain configurations, certain of these (or other) sections may overlap while others may not. For example, as depicted in FIGS. 33-35, upper insert section 1400a may not overlap with middle insert section 1400b, which may overlap with lower insert section 1400c. It will be understood that various other configurations may also be possible, including configurations with greater (or fewer) numbers of insert sections, with various insert sections extending over different portions of the interior of housing 402 or seed path 1402, and so on. (As noted above, in various embodiments delivery system 400 may be oriented generally vertically, generally horizontally, or otherwise. As such, section 1400a may not necessarily be an actual "upper" section of insert 1400, and section 1400c may not necessarily be an actual "lower" section of insert 1400.)

In order to assist in alignment of insert 1400 with, and retention of insert 1400 within, housing 402, various features may be provided on insert 1400 (and housing 402). Still referring to FIGS. 33-35, for example, each of insert sections 1400a, 1400b, and 1400c may include one or more alignment tabs 1406 extending away from wear surface 1418 (which surface 1418 may, as noted above, be interposed between housing 402 and bristles 428, seed 152, and so on). Similarly, various insert sections (e.g., middle and lower insert sections 1400b, 1400c) may include one or more retention tabs 1408, which may also extend away from wear surface 1418 and which may be generally longer than various alignment tabs 1406. As depicted in FIGS. 33-35, certain retention tabs 1408 may include a wider portion nearer the main body of insert 1400, with a narrower portion at the opposite end. Also as depicted in FIGS. 33-35, this may result, at least in part, from inclusion of shoulder 1448 on certain retention tabs 1408.

Other features may also be included to assist in alignment or retention of insert 1400, to provide additional protection for seed 152 or other components of planting unit 14, or to provide other functionality. In certain embodiments, various flanges may be provided on various portions of insert 1400. As depicted in FIGS. 33-35, for example, upper insert section 1400*a* may include upper flange 1410, middle insert section 1400*b* may include middle flanges 1412, and lower insert section 1400*c* may include lower flanges 1414. Various other features may also be included, such as mounting hook 1416, depicted in FIGS. 33-35 as included in lower insert section 1400*c*, and extended flange 1442, depicted in FIGS. 33-35 as included in middle insert section 1400*b*.

It will be understood, in light of the discussion herein, that the inclusion in the various figures of various features in a particular insert section (e.g., insert sections 1400*a*, 1400*b* or 1400*c*) may represent only an example configuration and, as such, may not be intended to limit the disclosure to the particular embodiments explicitly depicted. For example, various features depicted (and described) as being included on insert section 1400*b* may additionally (or alternatively) be included on insert sections 1400*a* or 1400*c*. Likewise, in embodiments with a different number (or configuration) of insert sections, various features depicted (and described) herein as being included on a particular insert section 1400*a*, 1400*b*, or 1400*c* may be additionally (or alternatively) included on another insert section.

Figure 36:
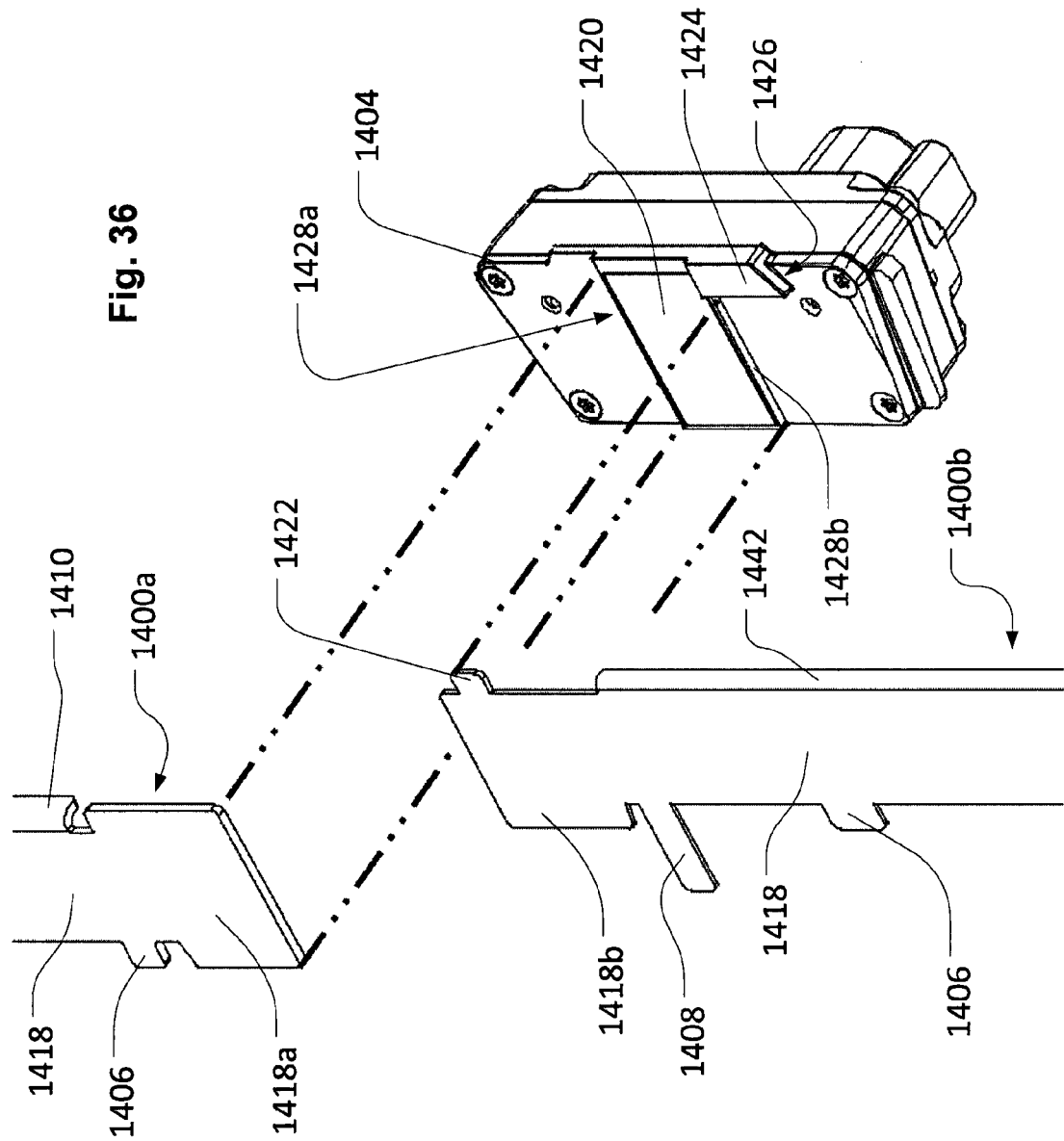
FIG. 36 is an enlarged perspective view of portion A-A of FIG. 35.

Referring now also to FIG. 36, portion A-A of FIG. 35 is depicted in an enlarged view. As can be seen in FIG. 36, seed sensor 1404 may include sensing unit 1420 (e.g., a sapphire window over an optical or other sensor), which may require a line of sight to (or other unimpeded perspective on) seed 152 in order to determine the passage of seed 152 along seed path 1402. Accordingly, it may be useful to provide a configuration of insert 1400 that preserves such a line of sight (or other perspective). To this end, for example, upper insert section 1400*a* may be configured to align with a portion of seed sensor 1404 that is upstream of sensing unit 1420, from the perspective of seed path 1402. Likewise, middle insert section 1400*b* may be configured to align with a portion of seed sensor 1404 that is downstream of sensing unit 1420, from the perspective of seed path 1402. (In the discussion below, unless otherwise noted, "upstream" and "downstream" will also be used with respect to seed path 1402.) In this way, insert 1400 may be installed in housing 402 without obstructing the detection of seed 152 by sensing unit 1420.

Still referring to FIG. 36, it may also be useful to provide a configuration of wear surface 1418 (and upper and middle insert sections 1400*a* and 1400*b*) that appropriately protects the body of sensor 1404. Accordingly, in certain embodiments, wear surface 1418 may include extended wear surface 1418*a* on upper insert section 1400*a* and extended wear surface 1418*b* on lower insert section 1400*b*. As depicted, extended wear surfaces 1418*a*, 1418*b* may largely cover the portion of seed sensor 1404 that is exposed to seed path 1402 or bristles 428 (aside from sensing unit 1420), thereby further protecting sensor 1404 from wear.

Other features may also be included to assist in alignment and retention of insert 1400 with respect to seed sensor 1404, as well as to provide other functionality. For example, sensor alignment tab 1422 may be provided on wear surface 1418*b*, with sensor tab 1424 forming complimentary sensor recess 1426 on seed sensor 1404. With such a configuration, for example, sensor alignment tab 1422 may be inserted into sensor recess 1426 to assist in aligning middle insert section 1400*b* with (and retaining middle insert section 1400*b* on) seed sensor 1404.

Continuing, it can be seen that sensing unit 1420 may form (or may be included on seed sensor 1404 near) upstream shoulder 1428*a* and downstream shoulder 1428*b*. In certain embodiments, the thickness of insert sections 1400*a* and 1400*b* at wear surfaces 1418*a* and 1418*b*, respectively, may be configured to approximately match the depth of shoulders 1428*a* and 1428*b* with respect to the exposed surface of sensing unit 1420. In this way, for example, as seed 152 moves across surface 1418*a*, sensing unit 1420, and then surface 1418*b*, seed 152 may be presented with a relatively smooth contact surface. By eliminating certain sharp or otherwise abrupt edges along seed path 1402, such a configuration may, for example, contribute to further reduction in wear on seed 152 (or various components of delivery system 400).

In certain embodiments, alternative configurations may also be possible. For example, shoulder 1428*b* may be configured to be deeper than shoulder 1428*a* such that seed 152 experiences a "cliff" rather than a "wall" as it moves across the interface between sensing unit 1420 and wear surface 1418*b*. This may allow seed 152 to tumble outward over the "cliff" and onto wear surface 1418*b* without sharp contact with insert section 1400*b*, rather than causing seed 152 to be deflected inward (toward bristles 428) by a potentially sharp contact with a sudden "wall." Similarly, in certain embodiments the thickness of middle insert section 1400*b* at wear surface 1418*b* may be configured to be smaller than the depth of shoulder 1428*b*, which may result in the same "cliff" effect as seed 152 moves onto wear surface 1418*b*.

Referring also to FIGS. 37A-37D, insert 1400 may include (as also described above) various alignment tabs 1406 and various retention tabs 1408. In turn, housing 402 may include various alignment openings 1432 and various retention openings 1434, which may be configured, respectively, in a complimentary arrangement with the various tabs 1406 and 1408. This may, for example, facilitate relatively easy installation of insert 1400 within housing 402, including without the use of specialized tools, equipment, or procedures. (As depicted, openings 1432 extend through housing 402. It will be understood that other configurations may be possible. For example, various openings 1432 may not extend through housing 402 but may instead define an alignment recess (not shown) on the interior of housing 402, into which various corresponding alignment tabs 1406 may be inserted.)

Figure 37A:
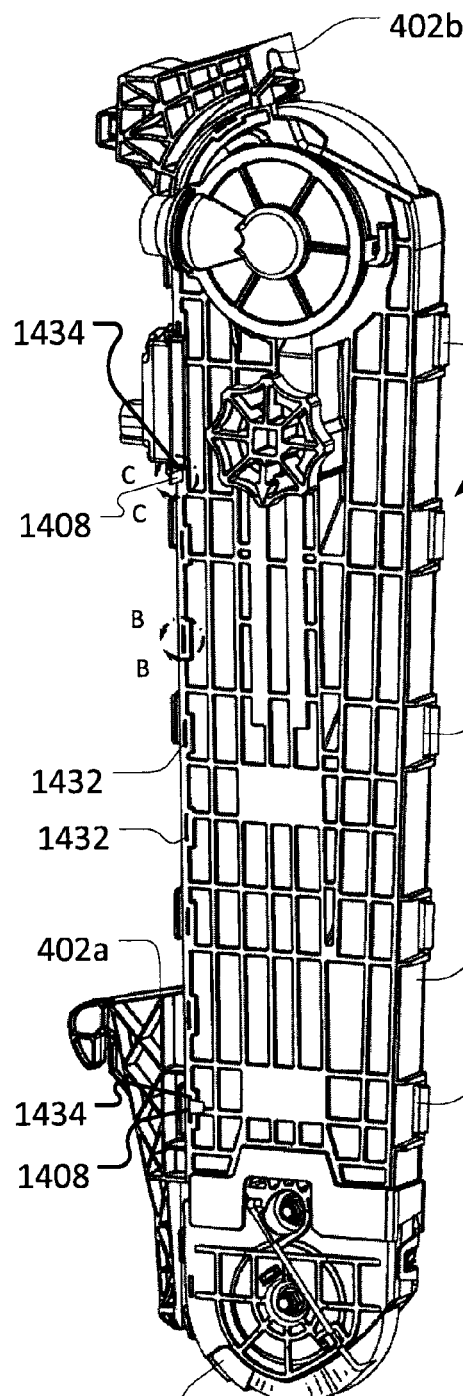
FIG. 37A is a perspective view of the seed delivery system of FIG. 31.
Figure 37B:
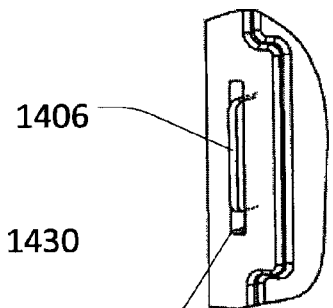
FIG. 37B is an enlarged perspective view of portion B-B of FIG. 37A.
Figure 37C:
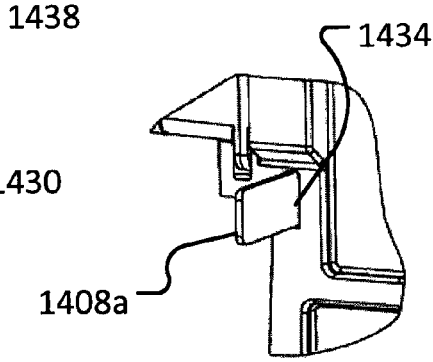
FIGS. 37C and 37D are enlarged perspective views of portion C-C of FIG. 37A, showing different configurations of a deformable mounting tab of the wear liner shown in FIG. 32.
Figure 37D:
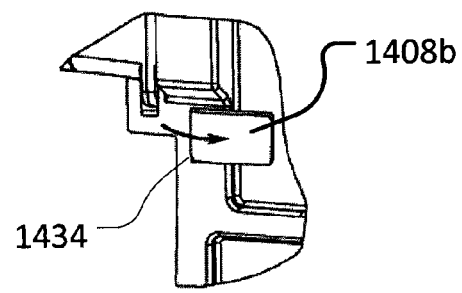

As can be seen in detail in FIG. 37B, for example, as insert 1400 is installed in housing 402, various alignment tabs 1406 on insert 1400 may be inserted into corresponding alignment openings 1432 on housing 402. The complimentary configuration of alignment tabs 1406 and alignment openings 1432 may accordingly provide both a visual and a tactile indicator that insert 1400 is appropriately aligned within housing 402. For example, in order to install insert 1400 within housing 402, an operator may open cover 1438 around hinges 1430, position insert 1400 (or various sections 1400*a*, 1400*b*, or 1400*c* thereof) so as to insert alignment tabs 1406 into alignment openings 1432, then close cover 1438 to further hold insert 1400 in place within housing 402. (It will be understood that reference to alignment of insert 1400 with housing 402 may also encompass alignment of insert 1400 with other components of seed delivery system 400 (e.g., bristles 428), which may themselves be aligned with housing 402 during operation of delivery system 400.)

Continuing, when alignment tabs 1406 are appropriately aligned with alignment openings 1432 (or insert 1400 is otherwise appropriately aligned with housing 402) retention tabs 1408 may also be aligned with corresponding retention openings 1434 in housing 402. As can be seen in the various figures, retention tabs 1408 may be generally longer than alignment tabs 1406. In certain embodiments, retention tabs 1408 may be deformable in order to assist in retaining insert 1400 within housing 402. For example, as depicted in an enlarged view in FIGS. 37C and 37D, retention tab 1408 may be inserted into retention opening 1434 in non-deformed configuration 1408a (see FIG. 37C) then bent or otherwise deformed (see FIG. 37D) to example deformed configuration 1408b in order to resist withdrawal of retention tab 1408 from retention opening 1434 (and, thereby, to resist movement of insert 1400 away from its aligned orientation). In certain embodiments, shoulder 1448 (not shown in FIGS. 37A-D) may seat against an internal surface of housing 402 when retention tab 1408 is fully inserted into retention opening 1434, with tab 1408 being bent at (or near) shoulder 1448 to secure insert 1400 to housing 402.

Other configurations may also be possible. In certain configurations, various retention openings 1434 may not extend fully through housing 402. Likewise, various retention tabs 1408 may be configured to include various other retention features and to deform in other ways to secure insert 1400 to housing 402. For example, various retention tabs 1408 may include a hook or shoulder feature (not shown) which may seat against a corresponding ledge or recess (not shown) of various retention openings 1434 to secure insert 1400 to housing 402. In such a configuration, for example, retention tabs 1408 may deform by deflecting to the side in order for the hook/shoulder of the tab 1408 to clear the ledge/recess of the corresponding opening 1434, then spring back to seat the hook/shoulder of tab 1408 against the ledge/recess of opening 1434 and thereby resist withdrawal of tab 1408 from opening 1434.

Other features may also assist in alignment (or retention) of insert 1400 with respect to housing 402. For example, referring again to FIG. 32, opening 1440 may be provided in housing 402, through which upper flange 1410 may be inserted. When housing cover 1438 (not shown in FIG. 32) is closed, housing cover may hold flange 1410 against housing 402 at opening 1440 and thereby resist withdrawal of flange 1410 from opening 1440. This may serve to further retain insert 1400 in appropriate alignment within housing 402. Similar interaction between housing 402, cover 1438, opening 1444 and extended flange 1442 may also serve to align and retain insert 1400 within housing 402. (It will be understood that other configurations may also be possible. For example, extended flange 1442 may be replaced (or supplemented) with a number of distinct, shorter flanges (not shown) providing similar functionality with respect to one or more corresponding openings in housing 402.)

Referring also to FIGS. 38 and 39, in certain embodiments, mounting hook 1416 may be utilized to mount lower insert section 1400c to housing 402. For example, lower housing 402a may include mounting tab 1446, over which mounting hook 1416 may be placed. Such a configuration may useful for lower insert section 1400c, as it may strongly resist downward forces on insert section 1400c that might otherwise tend to eject insert section 1400c from lower opening 418 of housing 402.

Figures 40A, 40B:
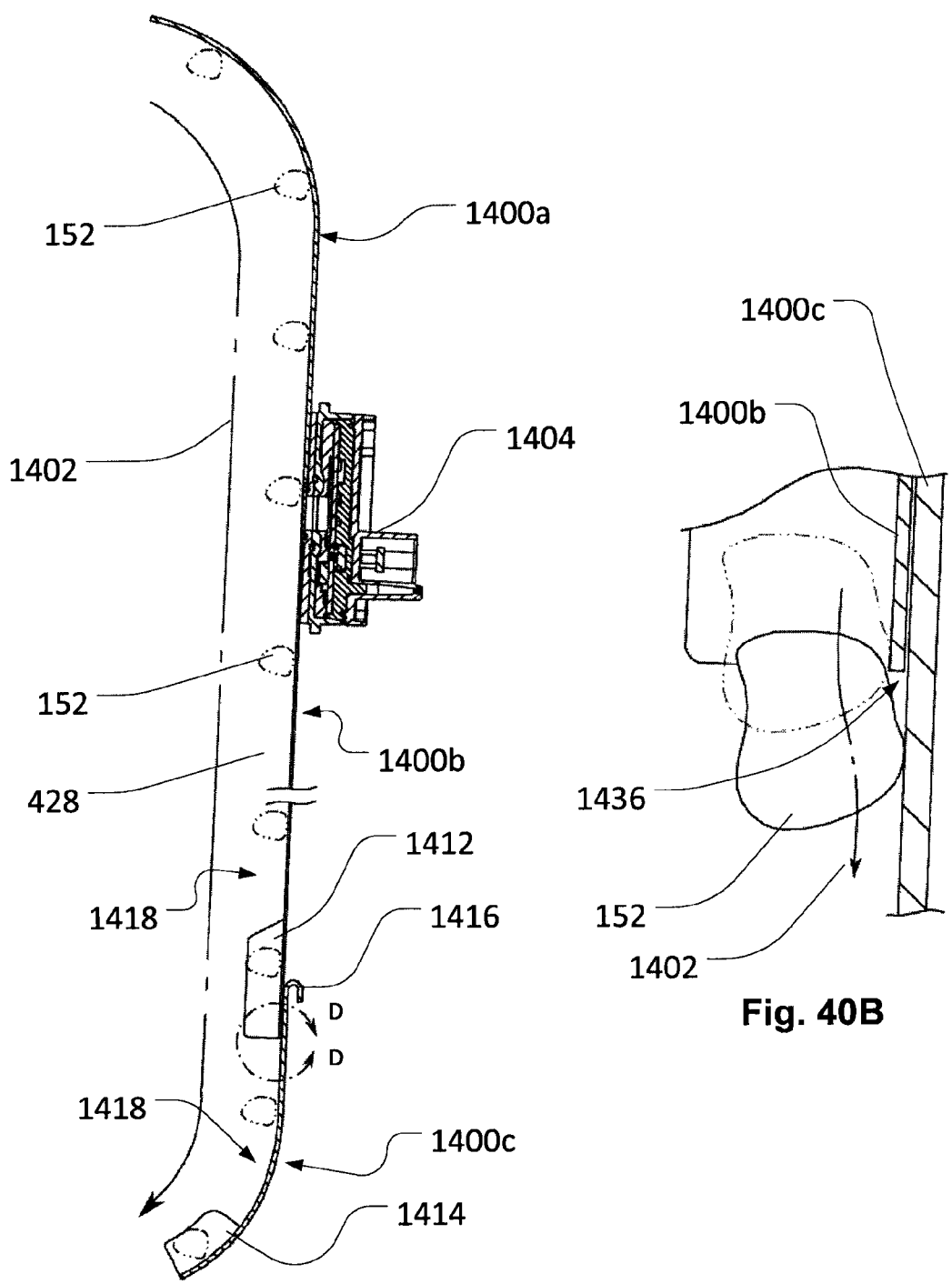
FIG. 40A is a side view of seed moving along the wear liner shown in FIG. 32.
FIG. 40B is an enlarged side view of portion D-D of FIG. 40A.

As also noted above, it may be useful to configure transitions between different sections of insert 1400 so as to avoid sharp edges along seed path 1402, and the associated potential for increased wear. In certain embodiments, at a transition from an upstream insert section (e.g., middle insert section 1400b) to a downstream insert section (e.g., lower insert section 1400c), it may be appropriate to provide for an increased clearance between the wear surfaces of the respective inserts and the seed transport mechanism carrying seed 152. Referring also to FIGS. 40A and 40B, for example, at the transition of seed 152 between middle insert section 1400b and lower insert section 1400c, shoulder 1436 (or other increase in clearance with respect to bristles 428) may be provided. In this way, as seed 152 moves from middle insert section 1400b to lower insert section 1400c, seed 152 may experience a "cliff," rather than a "wall," which may allow seed 152 to tumble outward onto lower insert section 1400c rather than cause seed 152 to be sharply deflected inward toward bristles 428.

It will be understood that various other configurations may additionally (or alternatively) be employed in order to avoid sharp edges or impacts on seed 152 (or components of seed delivery system 400) at transition points. For example, in a configuration in which middle insert section 1400b and lower insert section 1400c do not overlap, middle insert section 1400b may be configured to be thicker than lower insert section 1400b, such that lower insert section 1400c provides a larger clearance between wear surface 1418 and bristles 428 (or other components of seed delivery system 400) than does upper insert section 1400b. (With regard to the use of the term "clearance," it will be understood that in certain configurations bristles 428 or other components may actually contact various portions of wear surface 1418. In such configuration, even though bristles 428 or other components may not actually "clear" wear surface 1418, it will be understood that a "larger" clearance may simply indicate a lower degree of contact or deflection of bristles 428 by insert 1400 than a "smaller" clearance. In other words, in a configuration in which wear surface 1418 extends into contact bristles 428, a smaller clearance may result when surface 1418 extends farther into bristles 428.)

As also noted above, certain portions of insert 1400, such as lower wear liner flanges 1414, may extend outside of housing 402, thereby forming portions of insert 1400 that are external to housing 402. Such components may, among other functions, assist in protecting housing 402 (and other components of seed delivery system 400) from external wear. For example, as noted above, furrow opening disks 28 may be mounted to shaft 22 to open furrows for planting of seed 152. In various instances, deflection and deformation of disks 28 may cause disks 28 to contact housing 402 (or other components of seed delivery system 400), which may lead to wear. Features such as lower flanges 1414 may protect against this and other types of wear. Flanges 1414 may also, among other benefits, provide additional structural stability and support to housing 402 (e.g., to resist deflection or deformation of housing 402 from contact with disks 28, debris, or other objects).

Figure 41:
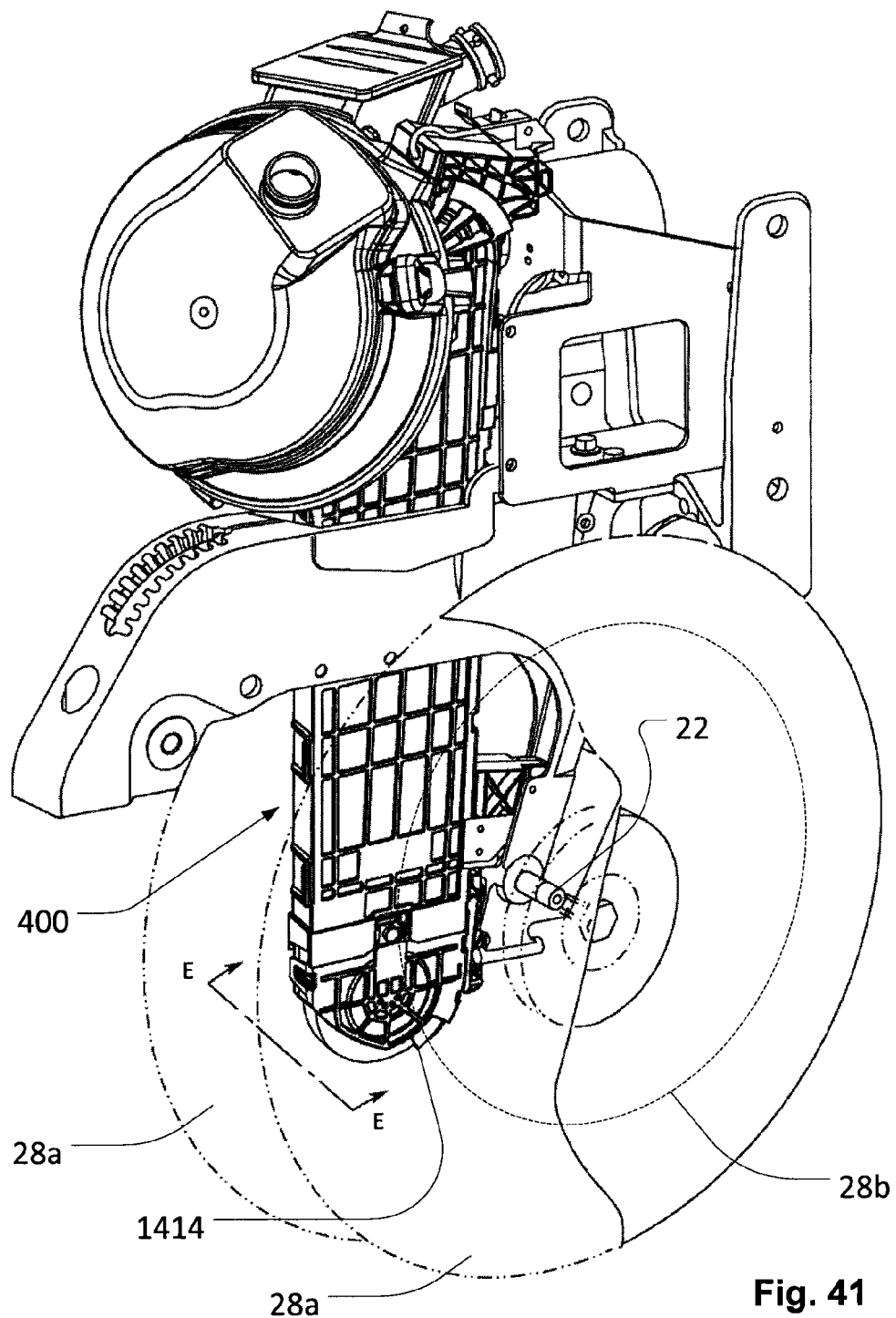
FIG. 41 is another side perspective view of a planting unit frame, seed meter and seed delivery system, including example furrow opening disks.
Figure 42:
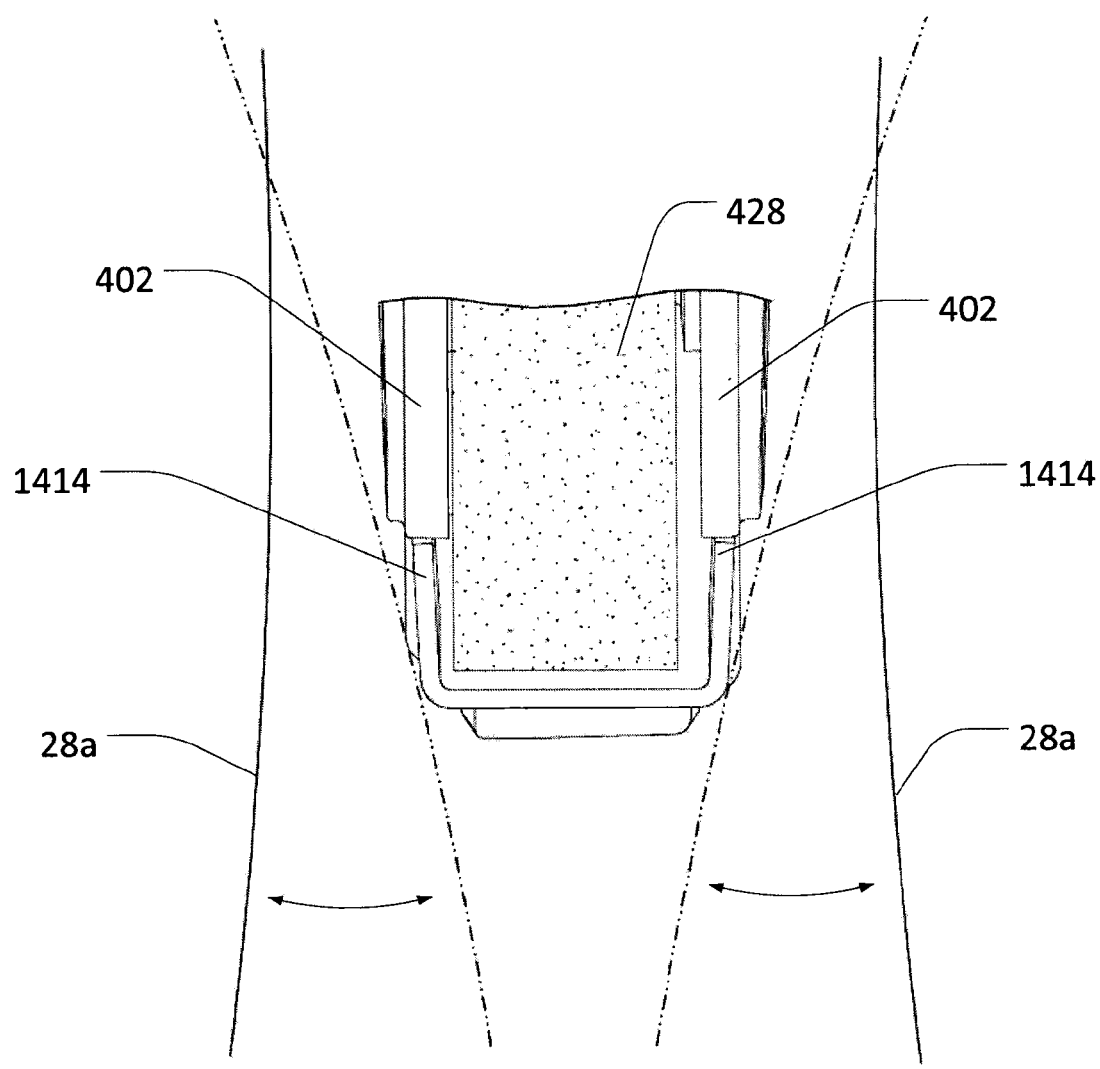
FIG. 42 is sectional view of the seed delivery system and furrow opening disks of FIG. 41, taken along plane E-E of FIG. 41.

Referring also to FIGS. 41 and 42, furrow opening disks 28 of various sizes may be mounted to shaft 22. For example, furrow opening disks 28a may have a diameter that extends past lower flanges 1414. In such a configuration, deflection or deformation of disks 28a (shown in FIG. 42 by double-headed arrows representing disk movement and by dashed lines representing a deflected/deformed position of disks 28*a*) may cause part of disks 28*a* to move toward housing 402. Lower flanges 1414 may then protect housing 402 from contacting disks 28*a*, by extending outside of housing 402 to intercept the body of disks 28*a* as they approach housing 402. Similarly, in certain embodiments, furrow opening disks 28*b* may have a diameter that extends to, but not past, lower flanges 1414. In such a configuration, deflection or deformation of disks 28*b* (not shown in FIG. 42) may cause part of disks 28*b* to move toward housing 402. Lower flanges 1414 may then protect housing 402 from contacting disks 28*b* by extending outside of housing 402 to intercept the outer edges of disks 28*b* as they approach housing 402.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. Explicitly referenced embodiments herein were chosen and described in order to best explain the principles of the disclosure and their practical application, and to enable others of ordinary skill in the art to understand the disclosure and recognize many alternatives, modifications, and variations on the described example(s).

For example, the general orientation of the seed meter and delivery system can differ from that depicted in the figures. In particular, the figures illustrate a generally vertically oriented delivery system. However, the delivery system can instead be generally horizontal or at an arbitrary angle to the horizon. Therefore, any words of orientation, such as various forms of "up", "down", "top", "bottom," "above," and "below", used herein are for the purpose of describing particular embodiments only and are not intended to be limiting of the disclosure.

Accordingly, various embodiments and implementations other than those explicitly described are within the scope of the following claims.

What is claimed is:

1. A wear liner for a seed delivery system housing, the seed delivery system housing containing, at least in part, a belt transport mechanism for moving seed along a seed path through the seed delivery system housing, the wear liner comprising:
   a wear liner insert extending along a portion of the seed path within the seed delivery system housing, the wear liner insert including a wear surface interposed between the belt transport mechanism and the seed delivery system housing to protect at least one of the seed and the seed delivery system housing from wear;
   wherein the wear liner insert includes a plurality of distinct insert sections including an upper insert section, and at least one of a middle insert section and a lower insert section disposed on opposite sides, with respect to the seed path, of a sensing unit of a seed sensor for seed traveling along the seed path.

2. A wear liner for a seed delivery system housing, the seed delivery system housing containing, at least in part, a belt transport mechanism for moving seed along a seed path through the seed delivery system housing, the wear liner comprising:
   a wear liner insert extending along a portion of the seed path within the seed delivery system housing, the wear liner insert including a wear surface interposed between the belt transport mechanism and the seed delivery system housing to protect at least one of the seed and the seed delivery system housing from wear;
   wherein the wear liner insert includes a plurality of distinct insert sections including at least two of an upper insert section, a middle insert section, and a lower insert section; and
   wherein a downstream end, with respect to the seed path, of one of the upper insert section and the middle insert section extends away from the seed delivery system housing toward the seed path to provide a first clearance between the wear liner insert and the belt transport mechanism; and
   wherein an upstream end, with respect to the seed path, of one of the middle insert section and the lower insert section, respectively, extends away from the seed delivery system housing toward the seed path to provide a second clearance between the wear liner insert and the belt transport mechanism, the upstream end being adjacent to the downstream end and the first clearance being smaller than the second clearance.

3. The wear liner of claim 1, wherein the wear liner insert includes one or more alignment tabs that extend into one or more complimentary alignment openings in the seed delivery system housing.

4. The wear liner of claim 1, wherein the wear liner insert includes one or more retention tabs that extend into one or more complimentary retention openings through the seed delivery system housing, the retention tabs being deformable when inserted into the retention openings in order to secure the wear liner insert to the seed delivery system housing.

5. The wear liner of claim 1, wherein a lower portion of the wear liner insert includes one or more wear liner flanges extending away from the wear surface, the one or more wear liner flanges extending outside the seed delivery system housing to protect the seed delivery system housing from one or more furrow opening disks.

6. The wear liner of claim 1, wherein the wear surface includes one or more areas of chrome plating.

7. A wear liner for a seed delivery system housing, the seed delivery system housing being located adjacent to one or more furrow opening disks and containing, at least in part, a transport mechanism for moving seed along a seed path through the seed delivery system housing, the wear liner comprising:
   a mounting portion secured to the seed delivery system housing; and
   one or more external liner portions extending outside the seed delivery system housing and away from the mounting portion to protect the seed delivery system housing from the one or more furrow opening disks.

8. The wear liner of claim 7, further comprising:
   a wear liner insert extending along a portion of the seed path within the seed delivery system housing, the wear liner insert including a wear surface interposed between the transport mechanism and the seed delivery system housing to protect at least one of the seed and the seed delivery system housing from wear.

9. The wear liner of claim 8, wherein the wear liner insert includes a plurality of distinct insert sections including at least two of an upper insert section, a middle insert section, and a lower insert section.

10. The wear liner of claim 9, wherein the upper insert section and at least one of the middle insert section and the lower insert section are disposed on opposite sides, with respect to the seed path, of a sensing unit of a seed sensor for the seed path.

11. The wear liner of claim 9, wherein a downstream end, with respect to the seed path, of one of the upper insert section and the middle insert section extends away from the seed delivery system housing toward the seed path to provide a first clearance between the wear liner insert and the transport mechanism; and wherein an upstream end, with respect to the seed path, of one of the middle insert section and the lower insert section, respectively, extends away from the seed delivery system housing toward the seed path to provide a second clearance between the wear liner insert and the transport mechanism, the upstream end being adjacent to the downstream end and the first clearance being smaller than the second clearance.

12. The wear liner of claim 8, wherein the wear liner insert includes one or more alignment tabs that extend into one or more complimentary alignment openings in the seed delivery system housing.

13. The wear liner of claim 8, wherein the wear liner insert includes one or more retention tabs that extend into one or more complimentary retention openings in the seed delivery system housing, the retention tabs being deformable when inserted into the retention openings in order to secure the wear liner insert to the seed delivery system housing.

14. The wear liner of claim 8, wherein the wear surface includes one or more areas of chrome plating.

* * * * *